(12) United States Patent
Takahashi

(10) Patent No.: US 7,973,911 B2
(45) Date of Patent: Jul. 5, 2011

(54) OBJECT MEASURING DEVICE AND METHOD FOR USE IN THE DEVICE

(75) Inventor: Yoshihiko Takahashi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 92 days.

(21) Appl. No.: 12/599,059

(22) PCT Filed: Dec. 15, 2008

(86) PCT No.: PCT/JP2008/003770
§ 371 (c)(1),
(2), (4) Date: Nov. 6, 2009

(87) PCT Pub. No.: WO2010/070701
PCT Pub. Date: Jun. 24, 2010

(65) Prior Publication Data
US 2011/0013172 A1    Jan. 20, 2011

(51) Int. Cl.
*G01C 3/08* (2006.01)
(52) U.S. Cl. .................................. 356/4.01
(58) Field of Classification Search ............ 356/4.01, 356/5.01, 5.1, 5.15, 28; 342/70–72
See application file for complete search history.

(56) References Cited

U.S. PATENT DOCUMENTS

| | | | |
|---|---|---|---|
| 5,283,622 A | 2/1994 | Ueno et al. | |
| 6,246,949 B1* | 6/2001 | Shirai et al. | 701/96 |
| 7,504,988 B2* | 3/2009 | Tsuchihashi et al. | 342/70 |
| 2002/0021450 A1* | 2/2002 | Aoki | 356/499 |
| 2006/0017912 A1 | 1/2006 | Egawa | |
| 2007/0205938 A1* | 9/2007 | Zimmermann et al. | 342/69 |
| 2009/0213359 A1* | 8/2009 | Fourcault et al. | 356/28 |
| 2010/0207806 A1* | 8/2010 | Takahashi et al. | 342/109 |
| 2011/0035093 A1* | 2/2011 | Moench et al. | 701/29 |

FOREIGN PATENT DOCUMENTS

| | | |
|---|---|---|
| JP | 4 43988 | 2/1992 |
| JP | 4 355390 | 12/1992 |
| JP | 11 72563 | 3/1999 |
| JP | 2000 329852 | 11/2000 |
| JP | 2002 131433 | 5/2002 |
| JP | 2003 42757 | 2/2003 |
| JP | 2006 30147 | 2/2006 |
| JP | 2006 236184 | 9/2006 |
| JP | 2006 320722 | 11/2006 |

* cited by examiner

*Primary Examiner* — Isam Alsomiri
(74) *Attorney, Agent, or Firm* — Oblon, Spivak, McClelland, Maier & Neustadt, L.L.P.

(57) ABSTRACT

Provided is an object measuring device capable of avoiding unnecessary scanning of an object that is unlikely to be an obstacle. By detecting a reflected light of a laser light emitted to an entire emission region, objects, other than a road surface, existing within the emission region are identified. When the objects other than the road surface are identified, a spread angle of the laser light, which is required for measuring the identified objects with a necessary accuracy, is determined. When the spread angle is determined, the laser light is emitted, at the determined spread angle, to the objects other than the road surface, and thereby the respective objects are measured.

8 Claims, 12 Drawing Sheets

FIG. 6
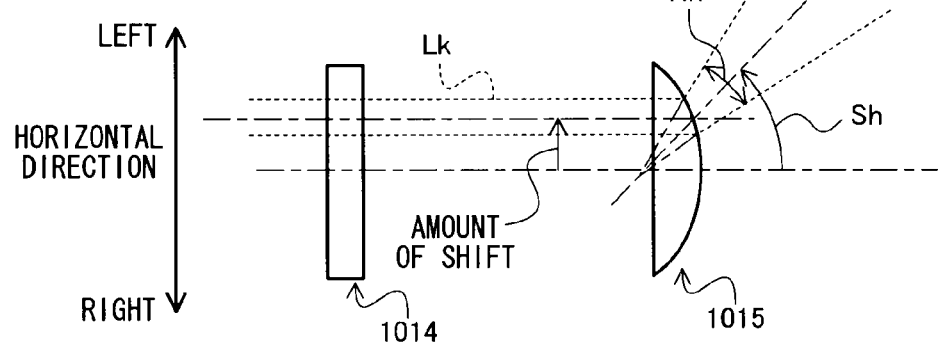
FIG. 7A
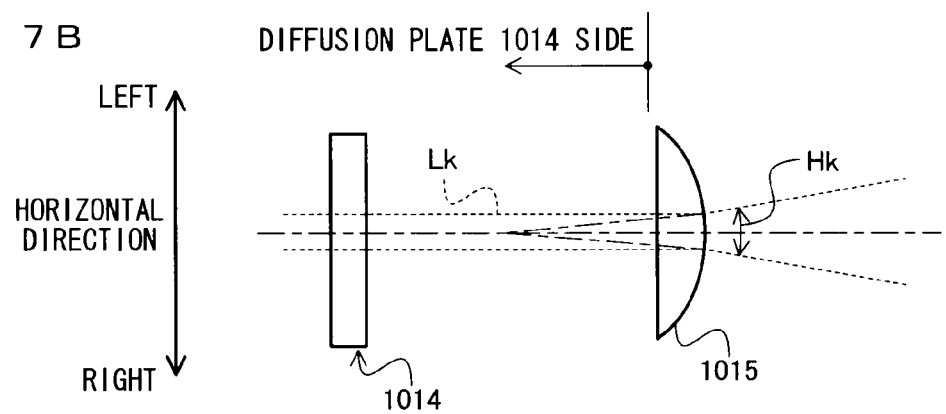
FIG. 7B

FIG. 10
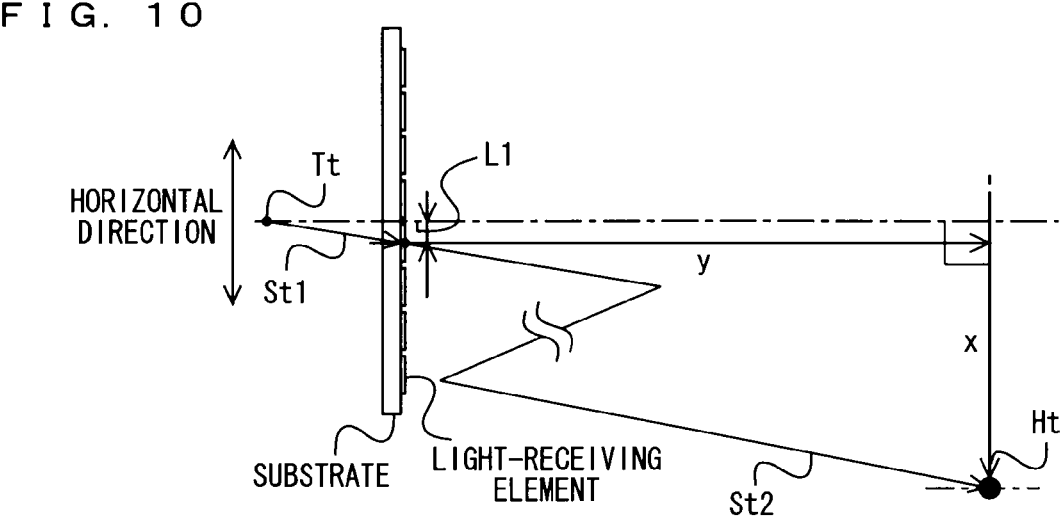
FIG. 11
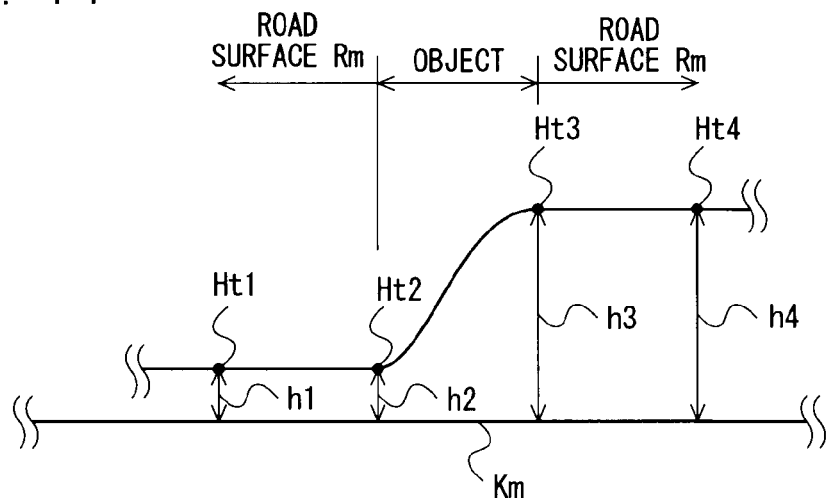
FIG. 12
| DIVERGENCE ANGLE Hk | 180° | 150° | 120° | 90° | 60° | 30° |
|---|---|---|---|---|---|---|
| RELATIVE S/N RATIO | 1 | 2 | 4 | 8 | 16 | 32 |
FIG. 13
| OBSTACLE ID | POSITION | SIZE | S/N | REQUIRED DIVERGENCE ANGLE | RELATIVE SPEED |
|---|---|---|---|---|---|
| 1 | x1, y1, z1 | X1, Y1 | S1 | Hh1 | Vx1, Vy1 |
| 2 | x2, y2, z2 | X2, Y2 | S2 | Hh2 | Vx2, Vy2 |
| 3 | x3, y3, z3 | X3, Y3 | S3 | Hh3 | Vx3, Vy3 |

Pt

Kg

F I G. 1 8
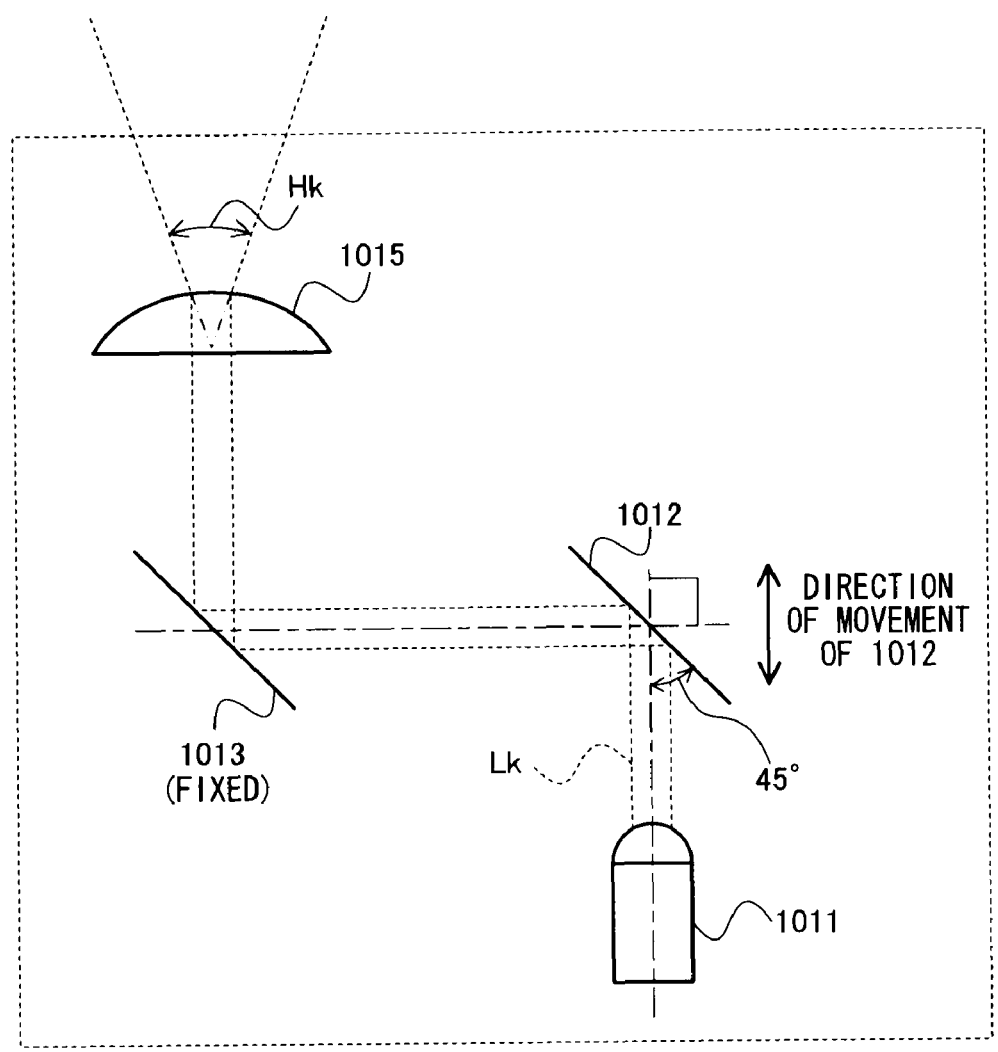

OBJECT MEASURING DEVICE AND METHOD FOR USE IN THE DEVICE

TECHNICAL FIELD

The present invention relates to an object measuring device, and more specifically relates to an object measuring device mounted in a mobile body such as an automobile.

BACKGROUND ART

Conventionally, an object measuring device which uses a laser light for measuring an object position and the like has been proposed. As an example of such an object measuring device, an environment recognition system (hereinafter referred to as a conventional art) disclosed in Patent Document 1 may be mentioned.

In the conventional art, while a measurement range is scanned by a laser light, a distance image is generated based on a reflected light received. In the conventional art, in order to shorten a time period required for measuring, at a high resolution, an object existing within the measurement range, the measurement range is firstly scanned as a standard region, and a distance image is generated. The standard region is scanned multiple times so that a plurality of distance images are generated. Then, in the conventional art, the distance images are compared with each other, to detect differences among the respective distance images. Based on the detected differences, a position of a moving object is detected. When the position of the moving object is detected, in the conventional art, a region, within the measurement range, containing only the detected object is defined as a partial region, and the partial region is scanned at a high resolution and at a lower speed than for scanning the standard region. In the conventional art, since only the region containing the detected object is scanned at a low speed, a time period required for scanning hardly increases even in scanning an object at a high resolution.

Patent Document 1: Japanese Laid-open Patent Publication No. 2006-30147

DISCLOSURE OF THE INVENTION

Problems to be Solved by the Invention

However, the conventional art described above raises the following problem. Namely, when using a method of comparing a plurality of distance images with each other to thereby detect a moving object as described above, a region containing something, such as a line defining a section where an own vehicle is driving, which is unlikely to be an obstacle and thus need not to be detected is also detected as a partial region. Thus, in the conventional art, the number of partial regions excessively increases, which may increase a time period required for performing high-resolution scanning.

Therefore, an object of the present invention is to provide an object measuring device capable of avoiding unnecessary measurement of an object which need not to be measured.

Solution to the Problems

A first aspect of the present invention is directed to an object measuring device mounted in a vehicle, including: a first emission section that emits, at a predetermined first spread angle, an electromagnetic wave to a predetermined region; a reception section that receives, by receiving elements arranged in a grid pattern, a reflected wave of the electromagnetic wave; a distance detection section that detects, for each of the receiving elements, a relative distance between each receiving element and a reflection point of the reflected wave, based on a reception time period from emission of the electromagnetic wave to reception of the reflected wave; a calculation section that calculates position information which indicates a position of the reflection point by using as a reference a position of mounting in the vehicle, based on at least the relative distance and an angle at which the reception section is mounted in the vehicle; a reference plane calculation section that calculates, as a reference plane, a plane parallel to a bottom surface of the vehicle, based on an orientation of the vehicle; an identification section that identifies, based on the position information, adjacent reflection points, wherein a difference in height from the reference plane between the adjacent reflection points is equal to or larger than a predetermined first threshold; and a second emission section that emits, at a second spread angle which is smaller than the first spread angle, the electromagnetic wave to the reflection points, when the identification section identifies the reflection points.

In a second aspect of the present invention based on the first aspect, when the identification section identifies the reflection points, the second emission section emits the electromagnetic wave to the reflection points, in order starting from the reflection point having the smallest relative distance.

In a third aspect of the present invention based on the first aspect: the object measuring device further includes an object identification section that: groups the reflection points identified by the identification section such that the adjacent reflection points which are spaced from each other over a distance equal to or less than a predetermined second threshold are in one group; and identifies the reflection points in one group, as one object; and the second emission section emits the electromagnetic wave to the reflection points of the object identified by the object identification section.

In a fourth aspect of the present invention based on the third aspect: the second emission section emits the electromagnetic wave to the reflection points, in order from the reflection point of the object closest to the object measuring device, among objects identified by the object identification section; and the distance detection section detects the relative distance for each object, in the order in which the second emission section has emitted the electromagnetic wave to the objects.

In a fifth aspect of the present invention based on the fourth aspect, the distance detection section detects the relative distance for each object, based on the reception time period for receiving the reflected wave having the highest intensity, among reflected waves reflected from the reflection points which have been grouped as the one object.

In a sixth aspect of the present invention based on the fifth aspect, after the distance detection section detects all the relative distances for the respective objects, the first emission section emits, at a third spread angle which is smaller than the first spread angle, the electromagnetic wave to a next predetermined region immediately following the region.

In a seventh aspect of the present invention based on any one of the fourth to sixth aspects, the object measuring device further includes a speed detection section that detects, for each object, a relative speed between the object measuring device and the object, based on the most recent relative distance and the previously detected relative distance which are respectively detected by the distance detection section.

An eighth aspect of the present invention is directed to an object measuring method which is performed in an object measuring device mounted in a vehicle. The object measuring method includes: a first emission step of emitting, at a predetermined first spread angle, an electromagnetic wave to a predetermined region; a reception step of receiving, by receiving elements arranged in a grid pattern, a reflected wave of the electromagnetic wave; a distance detection step of detecting, for each of the receiving elements, a relative distance between each receiving element and a reflection point of the reflected wave, based on a reception time period from emission of the electromagnetic wave to reception of the reflected wave; a calculation step of calculating position information which indicates a position of the reflection point by using as a reference a position of mounting in the vehicle, based on at least the relative distance and an angle at which the receiving element is mounted in the vehicle; a reference plane calculation step of calculating, as a reference plane, a plane parallel to a bottom surface of the vehicle, based on an orientation of the vehicle; an identification step of identifying, based on the position information, adjacent reflection points, wherein a difference in height from the reference plane between the adjacent reflection points is equal to or larger than a predetermined first threshold; and a second emission step of emitting, at a second spread angle which is smaller than the first spread angle, the electromagnetic wave to the reflection points, when the reflection points are identified in the identification step.

Effect of the Invention

According to the present invention, an object measuring device capable of avoiding unnecessary measurement of an object which need not to be measured can be provided.

BRIEF DESCRIPTION OF THE DRAWINGS

FIG. 6 is a diagram showing a direction in which a light-receiving position on the diffusion plate, at which the laser light is received, is controlled.

FIG. 7A is a diagram showing an example of a relationship between the light-receiving position on the diffusion plate, at which the laser light is received, and a direction in which the laser light is emitted from the lens.

FIG. 7B is a diagram showing an example of the relationship between the light-receiving position on the diffusion plate, at which the laser light is received, and the direction in which the laser light is emitted from the lens.

FIG. 10 is a diagram showing a relative distance between a light-receiving element and a reflection point.

FIG. 11 is a diagram showing reflection points of an object and a road surface.

FIG. 12 is a diagram showing an example of a spread angle calculation table.

FIG. 13 is a diagram showing an example of an object information table.

FIG. 18 is a diagram showing an example of another configuration of the emission section.

Figure 1A:
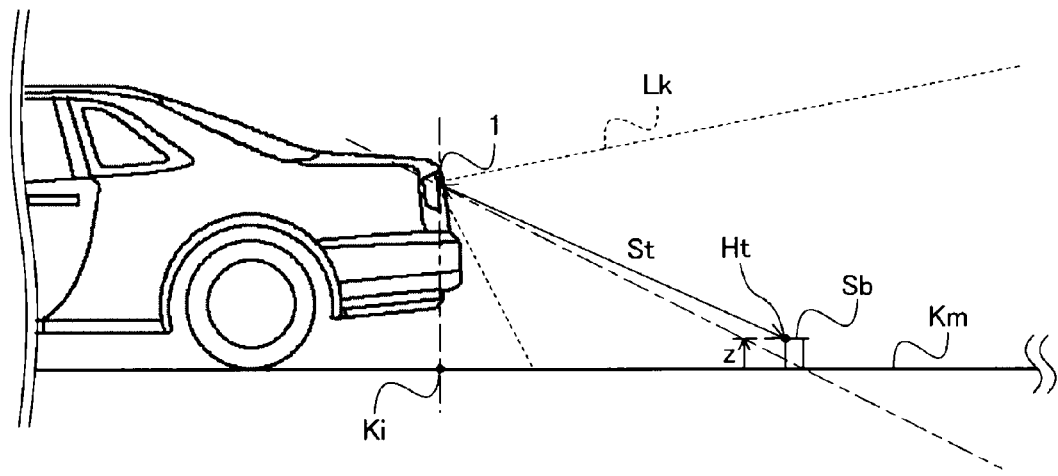
FIG. 1A is a diagram showing an example of a position at which an object measuring device is mounted.

DESCRIPTION OF THE REFERENCE CHARACTERS 1 object measuring device
101 emission section
102 detection section
103 control calculation section
1031 distance detection section
1032 position calculation section
1033 obstacle identification section
1034 spread angle determination section
1035 correction section

BEST MODE FOR CARRYING OUT THE INVENTION

First Embodiment

Figure 1B:
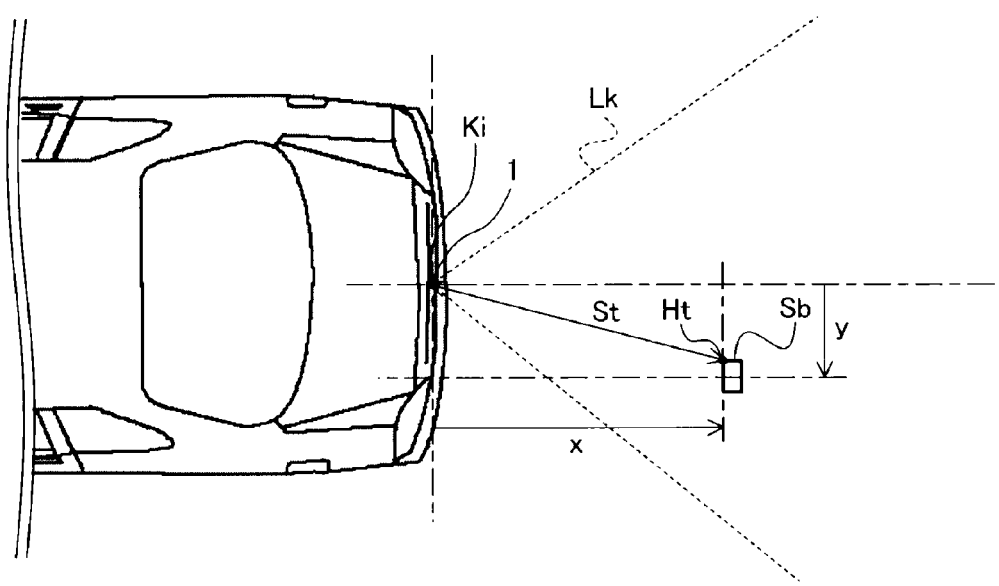
FIG. 1B is a diagram showing an example of the position at which the object measuring device is mounted.

FIG. 1A and FIG. 1B are diagrams illustrating one example of an application of an object measuring device 1 according to a first embodiment of the present invention. The object measuring device 1 is, for example, attached around a license plate at the rear of an own vehicle, such that a road surface Rm behind the own vehicle can be measured, as shown in FIG. 1A and FIG. 1B. The object measuring device 1 emits a laser light Lk, which will be described later, to a part or the whole of a detection range of a detection section 102, and receives, by the detection section 102, a reflected light obtained by the emitted laser light Lk being reflected from a reflection point Ht of an object such as the road surface Rm or an obstacle Sb. The object measuring device 1 detects a relative distance St from the reflection point Ht of the object, based on a light-receiving time from the emission of the laser light Lk to the reception of the reflected light by the detection section 102. Moreover, by using the relative distance St from the reflection point Ht, which has been detected, and on an angle (a pitch angle, a yaw angle, and a roll angle) at which the object measuring device 1 is attached to the own vehicle, the object measuring device 1 calculates coordinates in a three-dimensional coordinate system based on an originating position Ki which is a position on a reference plane Km vertically below the object measuring device 1, as shown in FIG. 1A and FIG. 1B. Here, for example, the reference plane Km is successively calculated, by a control calculation section 103, as a plane that is parallel to a bottom surface of the own vehicle in the aforementioned coordinate system, based on an orientation of the own vehicle such as an inclination thereof, which is detected by the detection section (sensor) not shown. Hereinafter, the object measuring device 1 according to the present embodiment will be described in more detail.

Figure 2:
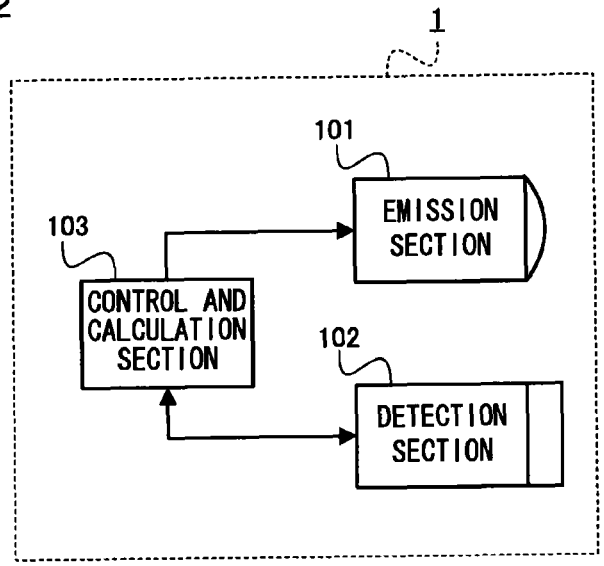
FIG. 2 is a block diagram showing a schematic configuration of the object measuring device.

FIG. 2 is a block diagram showing a schematic configuration of the object measuring device 1 according to the first embodiment of the present invention. The object measuring device 1 includes an emission section 101, a detection section 102, and a control calculation section 103.

Figure 3:
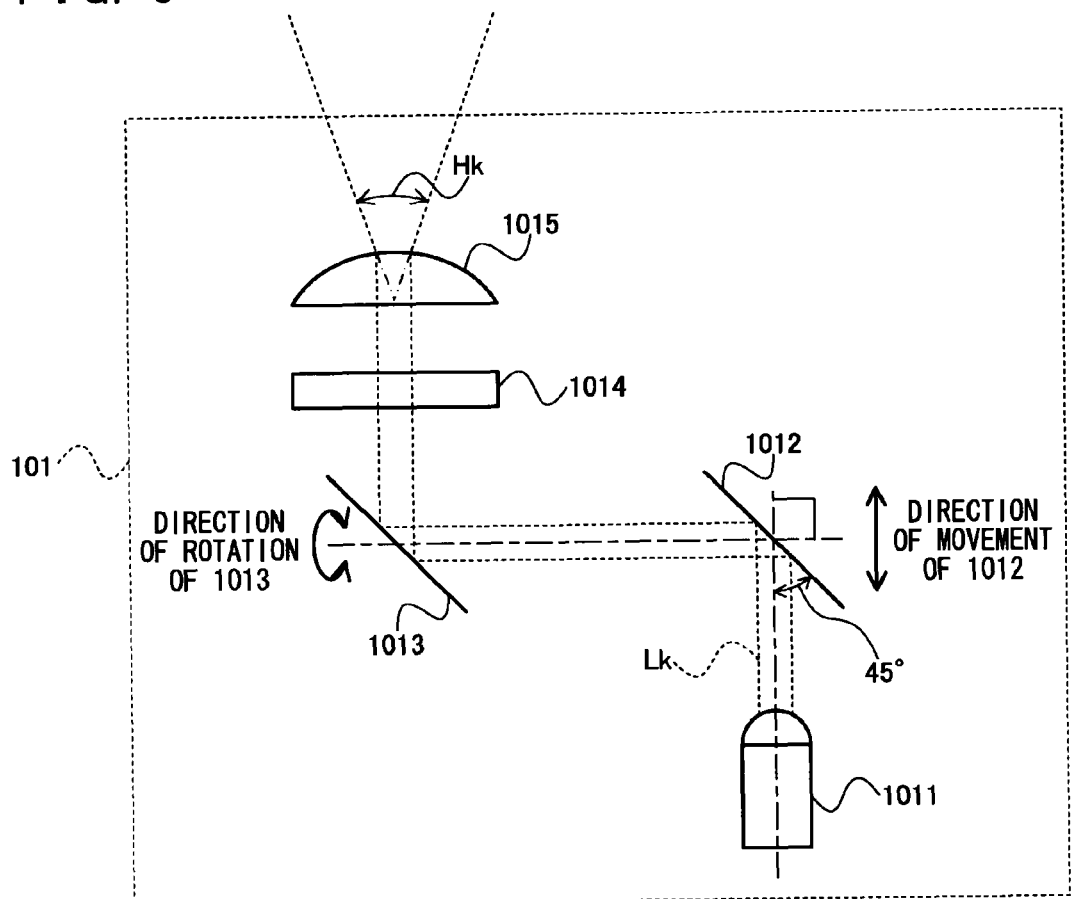
FIG. 3 is a diagram showing a more detailed configuration of an emission section.

FIG. 3 is a diagram showing a more detailed configuration of the emission section 101. The emission section 101 includes at least a light source 1011, a first reflecting plate 1012, a second reflecting plate 1013, a diffusion plate 1014, and a lens 1015.

The light source 1011 is typically a laser light source which emits a laser light having a frequency in the infrared region, and emits the laser light Lk to the first reflecting plate 1012.

The first reflecting plate 1012 is typically an MEMS (Micro Electro Mechanical System) mirror, and attached at an angle of 45 degrees with respect to the optical axis of the laser light Lk such that the first reflecting plate 1012 can orthogonally reflect the laser light Lk emitted from the light source 1011. Also, as shown in FIG. 3, the first reflecting plate 1012 is attached so as to be movable along the direction of the optical axis of the laser light Lk emitted from the light source 1011. The first reflecting plate 1012 is moved by a driving section, which is not shown.

The second reflecting plate 1013 is typically an MEMS mirror, and attached in such a manner that the second reflecting plate 1013 can reflect the laser light Lk, which has been reflected by the first reflecting plate 1012, toward the diffusion plate 1014. Also, as shown in FIG. 3, the second reflecting plate 1013 is attached so as to be rotatable about the optical axis of the laser light Lk reflected by the first reflecting plate 1012. The second reflecting plate 1013 is rotated by the driving section, which is not shown.

The diffusion plate 1014 is formed of a dielectric, such as a piezoelectric element capable of transmitting the laser light Lk therethrough, which is molded into a circular plate shape with a predetermined thickness. The diffusion plate 1014 has an edge thereof fixed. The diffusion plate 1014 is attached such that, in response to voltage applied by the driving section not shown, a central portion of a light receiving surface of the diffusion plate 1014 can move along an axis that passes through the center of the light receiving surface in the direction perpendicular to the light receiving surface and thereby the diffusion plate 1014 can be curved. Instead of the piezoelectric element, a liquid lens may be used for the diffusion plate 1014.

Figure 4A:
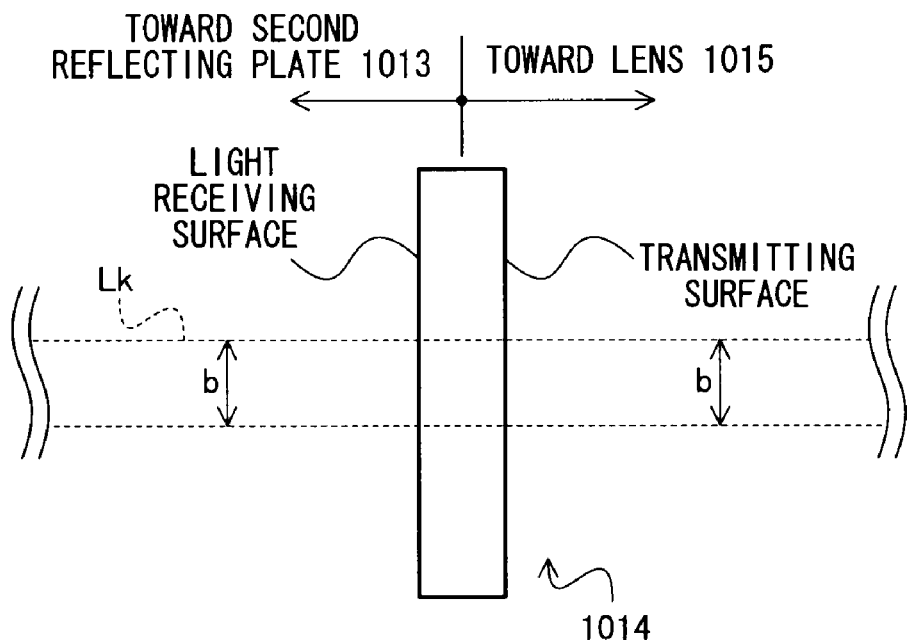
FIG. 4A is a diagram showing an example of a relationship between a direction in which a diffusion plate is curved, and the width of a laser light.
Figure 4B:
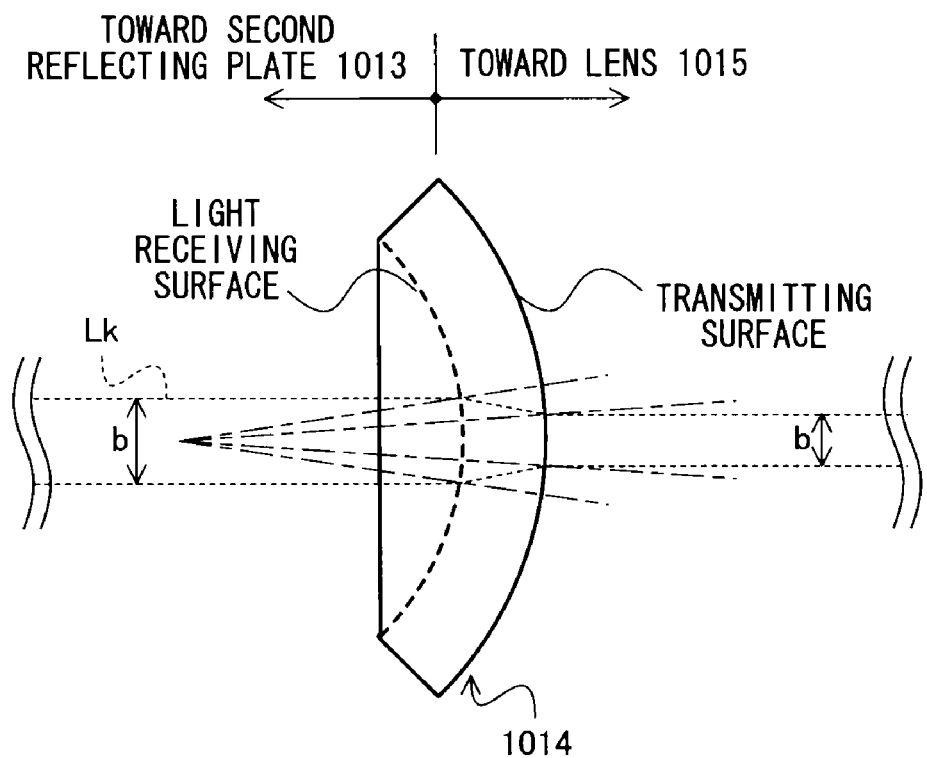
FIG. 4B is a diagram showing an example of the relationship between the direction in which the diffusion plate is curved, and the width of the laser light.
Figure 4C:
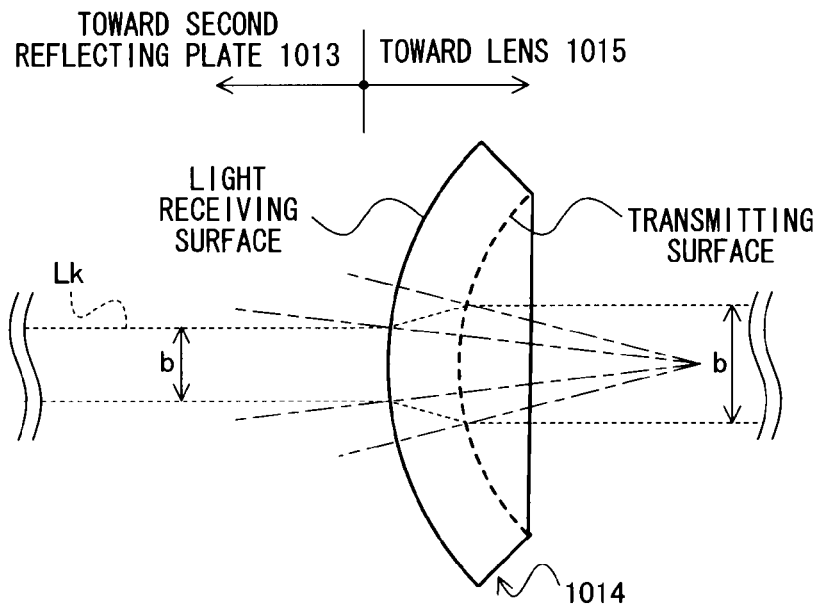
FIG. 4C is a diagram showing an example of the relationship between the direction in which the diffusion plate is curved, and the width of the laser light.

FIGS. 4A to 4C are diagrams each showing an example of the laser light Lk passing through the diffusion plate 1014. As shown in FIG. 4A, when the diffusion plate 1014 is not curved, that is, when, in the diffusion plate 1014, the light receiving surface and a transmitting surface for the laser light Lk are parallel to each other, the laser light Lk passes through the diffusion plate 1014 without changing the width b thereof.

When, as shown in FIG. 4B, the diffusion plate 1014 is curved so as to form a convex surface toward the lens 1015, the laser light Lk passing through the diffusion plate 1014 has the width b thereof decreased in accordance with the degree of the curve. When, as shown in FIG. 4C, the diffusion plate 1014 is curved so as to form a convex surface toward the second reflecting plate 1013, the laser light Lk passing through the diffusion plate 1014 has the width b thereof increased in accordance with the degree of the curve. As described above, by the diffusion plate 1014 being curved in response to the voltage applied by the driving section not shown, the diffusion plate 1014 can transmit therethrough the laser light Lk having been reflected by the second reflecting plate 1013, while changing the width of the laser light Lk. In FIGS. 4A to 4C, illustration of a fixing unit for fixing the edge of the diffusion plate 1014 is omitted for convenience of description.

Figure 5A:
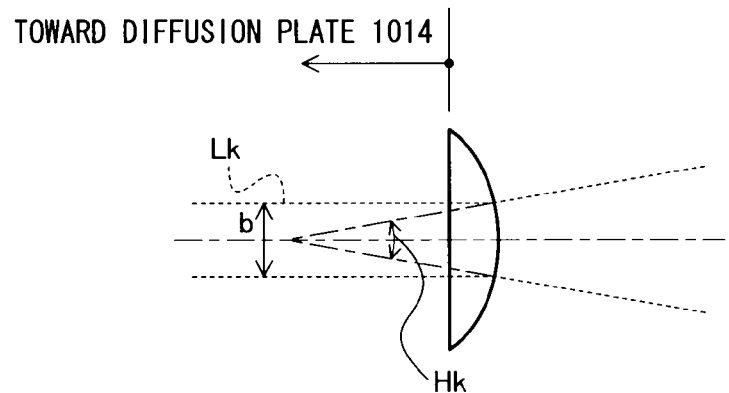
FIG. 5A is a diagram showing an example of a relationship between the width and a spread angle of the laser light.
Figure 5B:
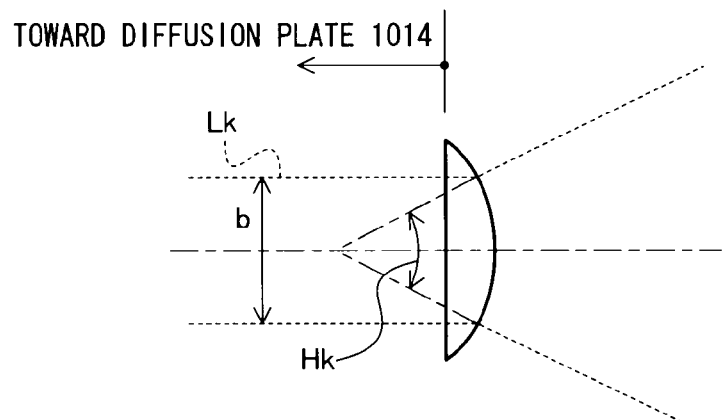
FIG. 5B is a diagram showing an example of the relationship between the width and the spread angle of the laser light.

The lens 1015 is typically a convex lens having a convex surface oriented in the direction in which the laser light Lk is emitted. As shown in FIGS. 5A and 5B, the lens 1015 refracts the laser light Lk having passed through the diffusion plate 1014, and radially emits the laser light Lk from an emitting surface. Each of FIGS. 5A and 5B is a diagram illustrating a relationship between the width b of the laser light Lk having passed through the diffusion plate 1014 and the spread angle Hk of the laser light Lk emitted from the emitting surface of the lens 1015.

In examples shown in FIGS. 5A and 5B, as apparent from the comparison between FIGS. 5A and 5B, the width b of the laser light Lk shown in FIG. 5B is larger than the width b of the laser light Lk shown in FIG. 5A. As apparent from the comparison between FIGS. 5A and 5B, when the laser light Lk having the larger width b passes through the lens 1015, the resulting spread angle Hk is larger. That is, the emission section 101 according to the present embodiment can control the spread angle Hk of the laser light Lk emitted from the emitting surface of the lens 1015, by curving the diffusion plate 1014 and thereby changing the width b of the laser light Lk.

FIG. 6 is a diagram illustrating an example of a relationship among a direction in which the first reflecting plate 1012 is moved, a direction in which the second reflecting plate 1013 is rotated, and a light-receiving position, on the diffusion plate 1014, at which the laser light Lk is received. FIG. 6 shows an example of the diffusion plate 1014 when viewed from the second reflecting plate 1013 toward the lens 1015. As shown in FIG. 6, the emission section 101 causes the first reflecting plate 1012 to move, by the driving section not shown, along the direction of the optical axis of the laser light Lk which is emitted from the light source 1011, and thereby can control the horizontal position of the light-receiving position, on the light receiving surface of the diffusion plate 1014, at which the laser light Lk is received. Moreover, as shown in FIG. 6, the emission section 101 causes the second reflecting plate 1013 to rotate about the optical axis of the laser light Lk having been reflected by the first reflecting plate 1012, by the driving section not shown, and thereby can control the vertical position of the light-receiving position, on the light receiving surface of the diffusion plate 1014, at which the laser light Lk is received.

Figure 7C:
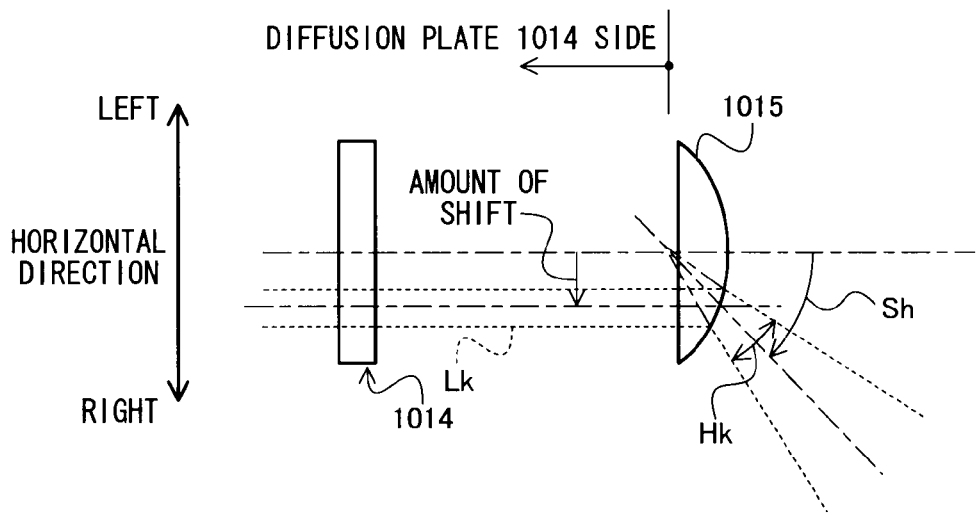
FIG. 7C is a diagram showing an example of the relationship between the light-receiving position on the diffusion plate, at which the laser light is received, and the direction in which the laser light is emitted from the lens.

FIGS. 7A to 7C are diagrams each showing an example of a relationship between the horizontal position of the light-receiving position on the diffusion plate 1014 at which the laser light Lk is received, and the emission direction in which the laser light Lk is emitted from the lens 1015. As shown in FIG. 7A, when the horizontal position of the light-receiving position on the diffusion plate 1014 at which the laser light Lk is received is shifted leftward from the center of the light receiving surface for example, a horizontal angle Sh of the emission direction in which the laser light Lk is emitted from the lens 1015 changes in accordance with the amount of the shift so as to orient the emission direction to the left. As shown in FIG. 7B, when the light-receiving position on the diffusion plate 1014 at which the laser light Lk is received is made coincident with the center of the light receiving surface of the lens 1015, the emission direction in which the laser light Lk is emitted from the lens 1015 is oriented to the front of the emitting surface. As shown in FIG. 7C, when the horizontal position of the light-receiving position on the diffusion plate 1014 at which the laser light Lk is received is shifted rightward from the center of the light receiving surface, a horizontal angle Sh of the emission direction in which the laser light Lk is emitted from the lens 1015 changes in accordance with the amount of the shift so as to orient the emission direction to the right. That is, in the emission section 101 according to the present embodiment, the first reflecting plate 1012 is moved along the optical axis direction of the laser light Lk emitted from the light source 1011, to thereby shift the horizontal position of the light-receiving position, on the light receiving surface of the diffusion plate 1014, at which the laser light Lk having been reflected by the second reflecting plate 1013 is received. In this manner, the horizontal angle Sh of the emission direction in which the laser light Lk is emitted from the emitting surface of the lens 1015 can be controlled. Here, the horizontal angle Sh is an angle which is formed, in the horizontal direction, between the optical axis of the laser light Lk emitted from the emitting surface of the lens 1015 and the axis that passes through the center of the emitting surface of the lens 1015 in the direction perpendicular to the emitting surface of the lens 1015.

In the same manner, when the vertical position of the light-receiving position on the diffusion plate 1014 at which the laser light Lk is received is shifted upward from the center of the light receiving surface, a vertical angle Vk of the emission direction in which the laser light Lk is emitted from the lens 1015 changes in accordance with the amount of the shift so as to orient the emission direction upward. When the light-receiving position on the diffusion plate 1014 at which the laser light Lk is received is made coincident with the center of the light receiving surface of the lens 1015, the emission direction in which the laser light Lk is emitted from the lens 1015 is oriented to the front of the emitting surface. When the vertical position of the light-receiving position on the diffusion plate 1014 at which the laser light Lk is received is shifted downward from the center of the light receiving surface, the vertical angle Vk of the emission direction in which the laser light Lk is emitted from the lens 1015 changes in accordance with the amount of the shift so as to orient the emission direction downward. That is, in the emission section 101 according to the present embodiment, the second reflecting plate 1013 is rotated about the optical axis of the laser light Lk emitted from the light source 1011, to thereby control the vertical angle Vk of the emission direction in which the laser light Lk is emitted from the emitting surface of the lens 1015. Here, the vertical angle Vk is an angle which is formed, in the vertical direction, between the optical axis of the laser light Lk emitted from the emitting surface of the lens 1015 and the axis that passes through the center of the emitting surface of the lens 1015 in the direction perpendicular to the emitting surface of the lens 1015.

As described above with reference to FIGS. 4A to 7C, the emission section 101 according to the present embodiment drives the first reflecting plate 1012, the second reflecting plate 1013, and the diffusion plate 1014 by the driving section which is not shown, and thereby the laser light Lk is emitted so as to have the spread angle Hk and the emission direction (the horizontal angle Sh and the vertical angle Vk) in accordance with an instruction indicating an emission region, which is provided by a distance detection section 1031 as will be described later.

The detection section 102 is typically a solid-state imaging device in which light-receiving elements such as CCD (Charge Coupled Device) elements are arranged in a grid pattern on a flat substrate, and a reflected light, which is obtained by the laser light Lk emitted from the emission section 101 being reflected from the reflection point Ht, is received by each of the light-receiving elements via a lens. When an instruction to start a charge storage for a predetermined first time period is provided by the distance detection section 1031 as will be described later, the detection section 102 starts to store, through the first time period, a charge corresponding to the amount of light received by each of the light-receiving elements. In the first time period, since the laser light Lk is not emitted from the emission section 101, a charge stored by each of the light-receiving elements of the detection section 102 is a charge corresponding to the amount of only an ambient stray light (such as sunlight) received. When the first time period elapses, the detection section 102 stops the charge storage which has been performed by each of the light-receiving elements.

When the first time period elapses, the detection section 102 according to the present embodiment immediately starts a charge storage again by each of the light-receiving elements, for a predetermined second time period. Almost at the same time, an instruction to emit the laser light Lk is provided by the distance detection section 1031 to the emission section 101, as will be described later. Therefore, a charge stored by each of the light-receiving elements through the second time period is a charge corresponding to the amount of an ambient stray light and the aforesaid reflected light which are received. When the second time period elapses, the detection section 102 stops the charge storage which has been performed by each of the light-receiving elements.

When the detection section 102 stops the charge storage for the second time period, the detection section 102 detects, for each of the light-receiving elements, a differential charge which is obtained by subtracting the charge stored through the second time period from the charge stored through the first time period. The differential charge which is obtained by subtracting the charge stored through the second time period from the charge stored through the first time period is a charge corresponding to the amount of only the reflected light received, which is obtained by subtracting the stored charge corresponding to the amount of only the ambient stray light received, from the stored charge corresponding to the amount of the ambient stray light and the reflected light which are received. In a time period obtained by subtracting the aforesaid first and second time periods from a predetermined third time period, the detection section 102 detects, for each of the light-receiving elements, the charge corresponding to the amount of only the reflected light received. When the third time period elapses after the distance detection section 1031 has provided, to the detection section 102, the instruction to start a charge storage for the first time period, the distance detection section 1031 detects the charge in each of the light-receiving elements, which has been detected by the detection section 102. When the third time period elapses and the charge in each of the light-receiving elements is detected by the distance detection section 1031, the detection section 102 resets the charge detected in each of the light-receiving elements.

Figure 8:
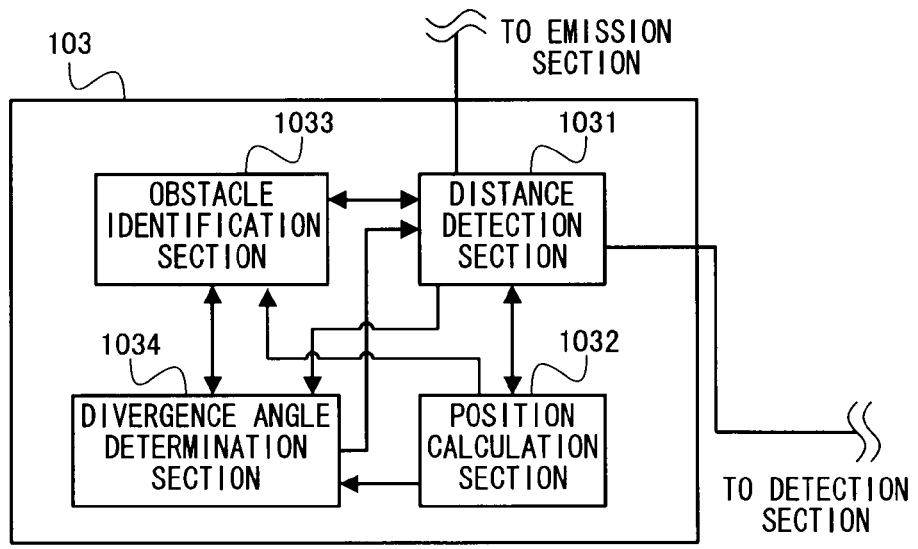
FIG. 8 is a functional block diagram showing functions of a control calculation section.

The control calculation section 103 is typically an arithmetic circuit mainly including an integrated circuit such as a CPU (Central Processing Unit). The control calculation section 103 functions at least as the distance detection section 1031, a position calculation section 1032, an obstacle identification section 1033, and a spread angle determination section 1034, as shown in FIG. 8. To be more specific, the control calculation section 103 causes the CPU to execute a program stored in a storage section, not shown, such as a ROM (Read Only Memory), to thereby cause the CPU to function as the distance detection section 1031, the position calculation section 1032, the obstacle identification section 1033, and the spread angle determination section 1034.

Figure 9:
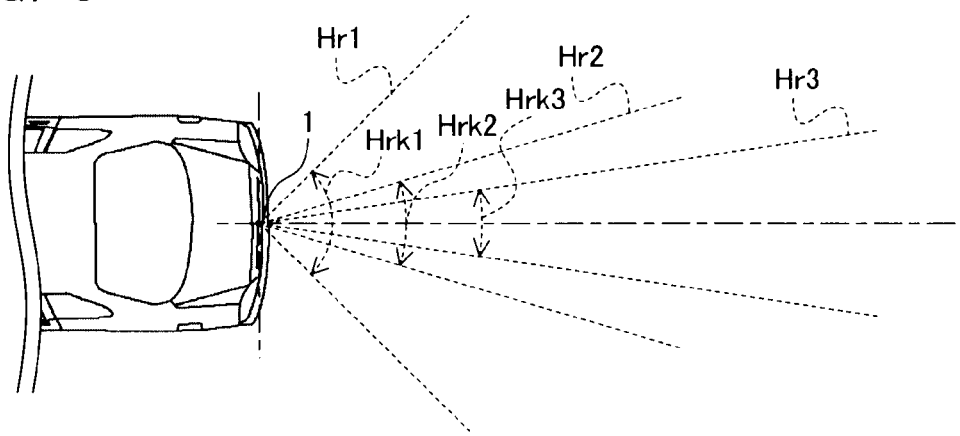
FIG. 9 is a diagram showing an example of an emission region.

FIG. 9 is a diagram showing an example of an emission region which is predefined in the storage section, not shown, of the control calculation section 103. FIG. 9 shows, as an example, three emission regions Hr1 to Hr3 which are predefined in the storage section, not shown, of the control calculation section 103. The emission region Hr1 to the emission region Hr3 decrease the spread angle Hk in order, respectively. The smaller the spread angle Hk is, the greater the distance over which the laser light Lk is emitted becomes.

The control calculation section 103 according to the present embodiment controls the emission section 101 and the detection section 102, respectively, so as to perform a measurement by emitting the laser light Lk to the three emission regions shown in FIG. 9, in order starting from the emission region Hr1 having the smallest emission distance to the emission region Hr3 having the greatest emission distance. Here, the spread angle Hk (hereinafter referred to as an emission region angle Hrk) of the emission region shown in FIG. 9 is decreased such that the emission region angle Hrk 1 of the emission region Hr1 to the emission region angle Hrk3 of the emission region Hr3 decrease in order, respectively. By decreasing the emission region angle Hrk to thereby narrow the emission region, a light energy density per emission region increases. Even if laser lights Lk have the same intensity, the laser light Lk having a higher light energy density reaches further. That is, the control calculation section 3 according to the present embodiment causes the emission section 101 to narrow the emission region angle Hrk without increasing the intensity of the laser light Lk, and thereby can increase the light energy density per emission region and cause the laser light Lk to reach further.

When measuring the emission region Hr1, the control calculation section 103 firstly performs an object identification process in which: an object existing in the emission region Hr1 is identified; and an object information table indicating information of the identified object is generated and stored in the storage section, not shown. In the following, the object identification process by the control calculation section 103 will be described. In the following description, as an example of the object identification process, an object identification process for identifying an object existing in the emission region Hr1 will be described in detail.

When performing the object identification process for the emission region Hr1, the control calculation section 103 firstly causes the distance detection section 1031 to provide the detection section 102 with an instruction to start a charge storage for the first time period, as described above. Then, when the first time period elapses after the instruction to start a charge storage for the first time period has been provided to the detection section 102, and subsequently the detection section 102 starts a charge storage for the second time period as described above, the control calculation section 103 causes the distance detection section 1031 to provide the emission section 101 with an instruction to emit a laser light Lk to the emission region Hr1.

When the instruction indicating the emission region is provided by the distance detection section 1031, the emission section 101 drives the first reflecting plate 1012, the second reflecting plate 1013, and the diffusion plate 1014 by the driving section which is not shown, as described above, so as to emit a laser light Lk from the light source 1011 to the entire emission region (here, the emission region Hr1) having been indicated by the instruction, for a predetermined emission period.

When the aforesaid third time period elapses after the instruction to start a charge storage for the first time period has been provided, the control calculation section 103 causes the distance detection section 1031 to detect a charge which has been detected, for each light-receiving element, by the detection section 102 as described above. When the control calculation section 103 detects the charge which has been detected for each light-receiving element by the detection section 102, the control calculation section 103 calculates, for each light-receiving element, a relative distance St between each light-receiving element storing the charge and the reflection point Ht from which the reflected light to be received by the light-receiving element has been reflected, based on the detected charge.

More specifically, the ratio between the most recent charge of a light-receiving element, which is detected by the distance detection section 1031 of the control calculation section 103 when the third time period elapses, and the charge of the same light-receiving element having been detected for the immediately preceding time, has a certain relationship with the relative distance St between the light-receiving element and the reflection point Ht of the object from which the reflected light to be received by the light-receiving element has been reflected. Therefore, based on the ratio between the most recent charge, which is detected for each light-receiving element of the detection section 102 by the distance detection section 1031, and the charge having been detected for the immediately preceding time, the control calculation section 103 calculates the relative distance St between each light-receiving element and the reflection point Ht so as to associate the relative distance St with each light-receiving element. When the control calculation section 103 calculates the relative distance St for each light-receiving element, the distance detection section 1031 is caused to generate relative distance information Sj which indicates a light-receiving element and a relative distance St in association with each other.

When the distance detection section 1031 of the control calculation section 103 generates the relative distance information Sj, the distance detection section 1031 of the control calculation section 103 converts the relative distance St associated with a light-receiving element, into a brightness value indicating a brightness exhibited when the relative distance St is displayed on a display screen in which pixels corresponding to the respective light-receiving elements are arranged in a grid pattern. When the distance detection section 1031 converts the relative distance St associated with a light-receiving element, into a brightness value of a pixel corresponding to the light-receiving element, the distance detection section 1031 of the control calculation section 103 generates distance image information Kj which indicates, as a distance image, an image formed of the pixels that have brightness values obtained as a result of the conversion.

When the distance detection section 1031 of the control calculation section 103 generates the relative distance information Sj, the position calculation section 1032 is caused to acquire the generated relative distance information Sj. When the position calculation section 1032 acquires the relative distance information Sj, the control calculation section 103 calculates a position of a reflection point Ht in the above-described coordinate system, based on the position of a light-receiving element in the detection section 102, which is indicated by the relative distance information Sj, and on a relative distance St which is indicated in association with the light-receiving element by the relative distance information Sj. The position calculation section 1032 is caused to generate reflection point information Hj which indicates the position of the reflection point Ht having been calculated, in association with each light-receiving element indicated by the relative distance information Sj.

FIG. 10 is a diagram illustrating a method for calculating, by the position calculation section 1032 of the control calculation section 103, a position of a reflection point Ht in the above-described coordinate system, based on the position of a light-receiving element in the detection section 102, and on the relative distance St which is indicated in association with the light-receiving element by the relative distance information Sj. FIG. 10 is a plan view showing a positional relationship between the light-receiving elements arranged in a grid pattern on a flat substrate and a reflection point Ht from which a light is reflected to one of the light-receiving elements, when viewed from the above in the vertical direction. As apparent from FIG. 10, when perpendicular lines are drawn to a line passing through the center of the substrate perpendicularly to the substrate, from a light-receiving element and the reflection point Ht from which a light is reflected to the light-receiving element, respectively; two similar right-angled triangles can be drawn by using a straight line passing through the light-receiving element and the reflection point Ht from which the light is reflected to the light-receiving element. The length of each side of a right-angled triangle, which includes the light-receiving element and the perpendicular line extending from the light-receiving element to the line that passes through the center of the substrate perpendicularly to the substrate, is known, because the arrangement position of the light-receiving element is known. Accordingly, the position calculation section 1032 can calculate the x-coordinate and the y-coordinate of the reflection point Ht from which the light is reflected to the light-receiving element, based on the ratio between the length St1 of the hypotenuse of the right-angled triangle including the arrangement position of the light-receiving element, and the relative distance St2 between the light-receiving element and the reflection point Ht, as viewed from the above in the vertical direction as shown in FIG. 10.

Similarly, when a positional relationship between the light-receiving elements arranged in a grid pattern on the flat substrate and a reflection point Ht from which a light is reflected to one of the light-receiving elements is viewed edge-on in the horizontal direction, two right-angled triangles can be drawn. The length of each side of a right-angled triangle, which includes a light-receiving element and a perpendicular line extending from the light-receiving element to the line passing through the center of the substrate perpendicularly to the substrate, is known, because the arrangement position of the light-receiving element is known. Accordingly, the position calculation section 1032 can calculate the z-coordinate of the reflection point Ht from which the light is reflected to the light-receiving element, based on the ratio between the length of the hypotenuse of the right-angled triangle including the arrangement position of the light-receiving element and the relative distance between the light-receiving element and the reflection point Ht, as viewed edge-on in the horizontal direction.

The control calculation section 103 converts positions represented by the x-coordinate, the y-coordinate, and the z-coordinate, which have been respectively calculated by the position calculation section 1032, into positions, respectively, in the above-described coordinate system, based on the predetermined angle at which the object measuring device 1 is attached to the own vehicle. When the position calculation section 1032 of the control calculation section 103 converts the position of a reflection point Ht for every light-receiving element indicated by the relative distance information Sj, the position calculation section 1032 of the control calculation section 103 generates reflection point information Hj which indicates, in association with every light-receiving element, the position of the reflection point Ht which is obtained as a result of the conversion.

When the position calculation section 1032 of the control calculation section 103 generates the reflection point information Hj, the obstacle identification section 1033 of the control calculation section 103 acquires the generated reflection point information Hj. When the obstacle identification section 1033 acquires the reflection point information Hj, the obstacle identification section 1033 of the control calculation section 103 identifies, as an object reflection point Th, the reflection point Ht of a vehicle, a pedestrian, an obstacle, or the like, which exists on the road surface Rm, among the reflection points Ht indicated by the acquired reflection point information Hj.

FIG. 11 is a diagram showing an example of the object reflection point Th which is identified by the obstacle identification section 1033 of the control calculation section 103 based on the position of the reflection point Ht indicated by the reflection point information Hj. FIG. 11 shows, as an example, four reflection points Ht1 to Ht4 indicated by the reflection point information Hj. In FIG. 11: the heights of the reflection points Ht1 and Ht2 from the above-described reference plane Km are identical to each other; an inclination (difference) formed between the heights of the reflection points Ht2 and Ht3 from the above-described reference plane Km is larger than a predetermined first threshold; and the heights of the reflection points Ht3 and Ht4 from the above-described reference plane Km are identical to each other.

As shown in FIG. 11, based on the positions of the reflection points Ht indicated by the reflection point information Hj, the obstacle identification section 1033 of the control calculation section 103 identifies, as a reflection point Ht on the road surface Rm, such a reflection point Ht (in the example shown in FIG. 11, the reflection points Ht1 and Ht4) that the height thereof and the height of an adjacent reflection point Ht from the reference plane Km form an inclination equal to or less than the first threshold. On the other hand, based on the positions of the reflection points Ht indicated by the reflection point information Hj, the obstacle identification section 1033 of the control calculation section 103 identifies, as a face of an object other than the road surface Rm, such a reflection point Ht (the reflection points Ht2 and Ht3) that the height thereof and the height of an adjacent reflection point Ht from the reference plane Km form an inclination larger than the first threshold. Here, in the present embodiment, a reflection point Ht (in the example shown in FIG. 11, the reflection points Ht2 and Ht3) existing at a boundary between the road surface Rm and an object is identified as a reflection point Ht of the object. That is, in the example shown in FIG. 11, the reflection points Ht1 and Ht4 are identified as the reflection points Ht on the road surface Rm, and the reflection points Ht2 and Ht3 are identified as the reflection points Ht of the object.

The obstacle identification section 1033 of the control calculation section 103 identifies the identified reflection point Ht of the object, as the object reflection point Th. Since the obstacle identification section 1033 of the control calculation section 103 identifies the object reflection point Th; among the reflection points Ht indicated by the reflection point information Hj, a reflection point Ht of an object other than the road surface Rm, such as a vehicle, a pedestrian, and an obstacle, can be identified as the object reflection point Th, which can be distinguished from the reflection point Ht of the road surface Rm. Here, the control calculation section 103 may identify, as the object reflection point Th, such a reflection point Ht that the height thereof and the height of an adjacent reflection point Ht from the reference plane form an inclination equal to or larger than a predetermined threshold.

When identifying the object reflection point Th, the obstacle identification section 1033 of the control calculation section 103 recognizes, based on the positions of the object reflection points Th indicated by the reflection point information Hj, object reflection points Th located adjacent to each other over a distance equal to or less than a predetermined second threshold, as object reflection points Th for one object, and classifies the adjacent object reflection points Th into the same group. When all the object reflection points Th are classified into groups, the control calculation section 103 identifies, among the object reflection points Th for one object which have been recognized by the obstacle identification section 1033, the object reflection point Th closest to the object measuring device 1, based on the positions indicated by the reflection point information Hj. Then, the control calculation section 103 recognizes the position of the object reflection point Th thus identified, as the position of the object. When the obstacle identification section 1033 of the control calculation section 103 recognizes positions of all objects, the control calculation section 103 generates object position information Tj which indicates each recognized object, object reflection points Th for the object, and a position of the object, in association with one another. Here, the object reflection point Th to be recognized as the position of the object does not always have to be the object reflection point Th closest to the object measuring device 1 among the object reflection points Th for the one object.

When the distance detection section 1031 of the control calculation section 103 generates the distance image information Kj, the obstacle identification section 1033 of the control calculation section 103 acquires the generated distance image information Kj. Then, when the obstacle identification section 1033 of the control calculation section 103 generates the object position information Tj, the control calculation section 103 identifies, as a pixel group representing one object, all of pixels on the distance image which correspond to light-receiving elements, respectively, having received lights reflected from object reflection points Th which are associated with the one object by the object position information Tj generated. When the pixel group representing one object is identified, the obstacle identification section 1033 of the control calculation section 103 detects the maximum width and the maximum height of the identified pixel group on the distance image, as the size of the object. When the sizes of all the objects indicated by the object position information Tj are detected, the obstacle identification section 1033 of the control calculation section 103 generates size information Oj which indicates all the objects and the sizes of the respective objects in association with each other.

When the position calculation section 1032 of the control calculation section 103 generates the reflection point information Hj, the spread angle determination section 1034 of the control calculation section 103 acquires the reflection point information Hj generated. When the position calculation section 1032 of the control calculation section 103 generates the distance image information Kj, the spread angle determination section 1034 of the control calculation section 103 acquires the distance image information Kj generated. When the obstacle identification section 1033 of the control calculation section 103 generates the object position information Tj and the size information Oj, the spread angle determination section 1034 of the control calculation section 103 acquires the object position information Tj and the size information Oj generated.

When the spread angle determination section 1034 acquires the distance image information Kj and the object position information Tj, the control calculation section 103 identifies, based on the distance image information Kj, a brightness value of a pixel that corresponds to a light-receiving element having received a light reflected from the position of one object, which is indicated by the object position information Tj, as a brightness value of the one object. When the brightness value of the one object is identified, the spread angle determination section 1034 of the control calculation section 103 calculates an S/N ratio in the corresponding pixel as an S/N ratio of the object, based on the identified brightness value. Here, the S/N ratio in the present invention is a ratio between the intensity of the reflected light of the laser light Lk emitted from the emission section 101 and a noise (such as a dark current and a noise occurring in transferring a charge) of a circuit included in the detection section 102. The spread angle determination section 1034 of the control calculation section 103 calculates the S/N ratio in the corresponding pixel, based on the brightness value of the one object, a certain relationship at the time of converting the relative distance St into a brightness value of the distance image, the above-described certain relationship between the relative distance St and the charge, a predicted noise of the circuit, and the like.

When S/N ratios of all the objects indicated by the object position information Tj are calculated, the spread angle determination section 1034 of the control calculation section 103 generates signal intensity information Sk which indicates all the objects and the calculated S/N ratios of the respective objects, in association with each other.

When the spread angle determination section 1034 generates the signal intensity information Sk, the spread angle determination section 1034 of the control calculation section 103 calculates a required spread angle Hh, based on a required S/N ratio, which is in advance stored in the storage section, not shown, so as to correspond to each of the emission regions described above, and on an S/N ratio of each object indicated by the signal intensity information Sk. Here, as described above, the S/N ratio in the present invention is a ratio between the intensity of the reflected light of the laser light Lk emitted from the emission section 101 and a noise (such as a dark current and a noise occurring in transferring a charge) of a circuit included in the detection section 102. The higher the intensity of the reflected light is, the higher the charge stored in the light-receiving element becomes, which improves (raises) the S/N ratio. In addition, the relative distance St is calculated based on the ratio between the most recent charge detected by the distance detection section 1031 and the charge having been detected for the immediately preceding time as described above. Therefore, as the S/N ratio is higher and the charge detected by the distance detection section 1031 is higher, the relative distance St is calculated with an increased accuracy.

The above-mentioned required S/N ratio is a predetermined S/N ratio which is required for calculating the relative distance St with an accuracy necessary for each emission region. Based on the S/N ratio of an object, which is indicated by the signal intensity information Sk, and the required S/N ratio, the spread angle determination section 1034 determines the required spread angle Hh for measurement, with a necessary accuracy, of the relative distance St of the object.

FIG. 12 is a diagram showing an example of a spread angle calculation table which is stored in a storage section, not shown, and used when the spread angle determination section 1034 of the control calculation section 103 determines the required spread angle Hh. With reference to FIG. 12, a method for determining the required spread angle Hh by the spread angle determination section 1034 of the control calculation section 103 will be described. Firstly, the control calculation section 103 identifies, among the plurality of emission regions described above, the emission region obtained at the time when the spread angle determination section 1034 generates the signal intensity information Sk. When the emission region is identified (here, the emission region Hr1 is identified), the spread angle determination section 1034 of the control calculation section 103 identifies, from the spread angle calculation table shown in FIG. 12, a relative S/N ratio corresponding to the spread angle that is closest to the emission region angle Hrk of the identified emission region. When the relative S/N ratio is identified, the spread angle determination section 1034 of the control calculation section 103 calculates, as a difference S/N ratio, a ratio between the S/N ratio of the object indicated by the signal intensity information Sk and the required S/N ratio which is predetermined so as to correspond to the identified emission region. The spread angle determination section 1034 of the control calculation section 103 identifies, from the spread angle calculation table shown in FIG. 12, the spread angle Hk corresponding to the relative S/N ratio that is closest to an S/N ratio obtained by multiplying the identified relative S/N ratio by the difference S/N ratio.

When the spread angle determination section 1034 of the control calculation section 103 identifies the spread angle Hk, the spread angle determination section 1034 determines whether or not the identified spread angle Hk is equal to or greater than the emission region angle (here, the emission region angle Hrk 1 of the emission region Hr1). When the spread angle determination section 1034 determines that the identified spread angle Hk is not equal to or greater than the emission region angle, the control calculation section 103 determines the identified spread angle Hk as a required spread angle Hh for the object indicated by the signal intensity information Sk. On the other hand, when the identified spread angle Hk is equal to or greater than the emission region angle, the spread angle determination section 1034 determines, as the required spread angle Hh, an angle obtained by multiplying the emission region angle by a predetermined constant less than 1.

In the spread angle calculation table shown in FIG. 12, the spread angle Hk is set so as to decrease as the relative S/N ratio increases. When the spread angle determination section 1034 of the control calculation section 103 determines that the identified spread angle Hk is equal to or greater than the emission region angle, an angle that is obtained by multiplying the emission region angle by the predetermined constant less than 1 is determined as the required spread angle Hh. Accordingly, the required spread angle Hh determined by the spread angle determination section 1034 is an angle smaller than the emission region angle (in the example described above, the emission region angles Hrk1 to Hrk3) which is predetermined for each emission region (in the example described above, the emission regions Hr1 to Hr3).

By calculating the required spread angle Hh in the above-described manner, the spread angle determination section 1034 of the control calculation section 103 can determine, as the required spread angle Hh, an spread angle for measuring, with a necessary accuracy, a relative distance St to each reflection point Ht of the object, based on the S/N ratio of an object indicated by the signal intensity information Sk. When required spread angles Hh for all the objects indicated by the signal intensity information Sk are determined, the spread angle determination section 1034 of the control calculation section 103 generates required spread angle information Hj which indicates the determined required spread angle Hh in association with each object.

The table shown in FIG. 12 is illustrative, and the table may have any value as long as the spread angle Hk is set so as to decrease as the relative S/N ratio increases. In addition, the table shown in FIG. 12 is illustrative, and the relative S/N ratio may be any value as long as the table can set the required spread angle Hh that is optimal.

When the object position information Tj, the size information Oj, the signal intensity information Sk, and the required spread angle information Hj are generated, the distance detection section 1031 of the control calculation section 103 acquires the respective information generated. The distance detection section 1031 of the control calculation section 103 generates an object information table which indicates, in association with each object, the position of an object, the size of an object, the S/N ratio of an object, and the required spread angle Hh for an object, which are indicated by the respective information acquired. Then, the distance detection section 1031 stores the object information table in the storage section, not shown. FIG. 13 shows an example of the object information table generated by the distance detection section 1031. A relative speed in the table shown in FIG. 13 will be described later. The above is the description of the object identification process by the control calculation section 103. When the control calculation section 103 completes the object identification process for one emission region, the control calculation section 103 performs an individual measurement process for individually measuring objects existing in the same emission region identified in the object identification process. In the following, as an example of the individual measurement process, a case will be described in which, after the object identification process for the emission region Hr1 is completed, the individual measurement process for individually measuring the objects existing in the identified emission region Hr1 is performed.

For performing the individual measurement process for the emission region Hr1, the control calculation section 103 firstly causes the distance detection section 1031 to provide the detection section 102 with an instruction to start a charge storage for the first time period as described above. Thereby, the control calculation section 103 causes the detection section 102 to start the charge storage. Then, when the first time period elapses after the instruction to start a charge storage for the first time period has been provided, the control calculation section 103 causes the distance detection section 1031 to indicate, to the emission section 101, the position of and the required spread angle Hh for one object (hereinafter referred to as an individual object) which is indicated in the object information table. The emission section 101, to which the position of the individual object and the required spread angle Hh for the individual object have been indicated, drives the driving section, not shown, so as to emit, for the aforementioned emission period, the laser light Lk toward the position of the individual object which has been indicated, at the required spread angle Hh which has been indicated. At this time, the control calculation section 103 causes the detection section 102 to start a charge storage for the second time period. Thus, a charge corresponding to the amount of the reflected light, received by the light-receiving element, of the laser light Lk emitted toward the individual object which is indicated by the distance detection section 1031 is stored for each light-receiving element.

When the third time period elapses after the control calculation section 103 has caused the distance detection section 1031 to provide the detection section 102 with the instruction to start receiving the light, the distance detection section 1031 of the control calculation section 103 detects a charge in each light-receiving element of the detection section 102, and then the control calculation section 103 calculates a relative distance St as described above. At this time, the charge in each light-receiving element, which is detected by the distance detection section 1031, is a charge stored as a result of reception of the reflected light of the laser light Lk which has a higher light energy density, that is, the reflected light which has higher intensity, because the laser light Lk has been emitted toward the individual object at the required spread angle Hh which is smaller than the emission region angle Hrk1 as described above. Therefore, an accuracy of the relative distance St calculated at this time by the distance detection section 1031 is higher than an accuracy of the relative distance St calculated at the time when the laser light Lk is emitted to the entire emission region FM.

When the laser light Lk is emitted toward the individual object and the relative distance St is calculated, the distance detection section 1031 of the control calculation section 103 generates relative distance information Sj which indicates each calculated relative distance St and a light-receiving element in association with each other, as described above. The relative distance information Sj generated at this time is relative distance information Sj generated based on the reflected light of the laser light Lk emitted toward the individual object which is indicated by the object information table. When the relative distance information Sj is generated, the distance detection section 1031 of the control calculation section 103 generates distance image information Kj indicating a distance image obtained when the laser light Lk is emitted toward the individual object.

When the distance detection section 1031 of the control calculation section 103 generates the relative distance information Sj, the position calculation section 1032 of the control calculation section 103 acquires the generated relative distance information Sj. When the position calculation section 1032 of the control calculation section 103 acquires the relative distance information Sj, the position calculation section 1032 of the control calculation section 103 generates reflection point information Hj, as in the object identification process.

When the position calculation section 1032 of the control calculation section 103 generates the reflection point information Hj, the obstacle identification section 1033 of the control calculation section 103 acquires the generated reflection point information Hj. Moreover, when the distance detection section 1031 of the control calculation section 103 generates the distance image information Kj, the obstacle identification section 1033 of the control calculation section 103 acquires the generated distance image information Kj.

When the obstacle identification section 1033 acquires the reflection point information Hj and the distance image information Kj, the control calculation section 103 generates object position information Tj and size information Oj, as in the object identification process. The position of the individual object, which is indicated by the object position information Tj generated at this time, is a highly accurate position which is calculated based on the relative distance St having the high accuracy.

When the obstacle identification section 1033 of the control calculation section 103 generates the object position information Tj, the distance detection section 1031 of the control calculation section 103 acquires the generated object position information Tj. When the distance detection section 1031 acquires the object position information Tj, the control calculation section 103 updates the position of the individual object, which is indicated by the object information table and has been indicated to the emission section 101, into a position having an increased accuracy, which is indicated by the acquired object position information Tj. When the positions of all the individual objects indicated by the object information table are updated in the above-described manner, the control calculation section 103 completes the individual measurement process for the emission region Hr1. The above is the description of the individual measurement process for individually measuring objects existing in the same emission region identified in the object identification process.

In performing the individual measurement process, the control calculation section 103 may update the positions of the individual objects indicated by the object information table, sequentially from the position of the closest individual object.

When the object identification process and the individual measurement process for one emission region are completed, the control calculation section 103 determines whether or not the emission region having the next greatest emission distance after the emission distance of the emission region having been measured is in advance stored in a storage section, not shown. For example, the control calculation section 103 determines whether or not the emission region Hr2 having the next greatest emission distance after the emission distance of the emission region Hr1, which are shown as an example in FIG. 9, is in advance stored in the storage section, not shown. When the control calculation section 103 determines that the emission region having the next greatest emission distance is stored, the control calculation section 103 performs the object identification process and the individual measurement process for that emission region. By performing the object identification process and the individual measurement process for each emission region, the control calculation section 103 generates the object information table for each emission region, and updates the positions of the individual objects, which are indicated by the generated object information table, into positions having an increased accuracy. On the other hand, when the control calculation section 103 determines that the emission region having the next greatest emission distance is not stored in the storage section which is not shown, for example, when the measurement for the emission region Hr3 shown as an example in FIG. 9 is completed, the control calculation section 103 re-performs the object identification process and the individual measurement process for the emission region having the smallest emission distance, such as the emission region Hr1.

However, in a case where the control calculation section 103 cannot identify an object reflection point Th in performing the object identification process for one emission region, that is, in a case where no object exists in the emission region, the control calculation section 103 stops the object identification process, and then, without performing the individual measurement process, determines whether or not the emission region having the next greatest emission distance is in advance stored in the storage section, not shown, as described above.

When the control calculation section 103 re-performs the object identification process for the emission region for which the object information table has been already generated, the control calculation section 103 updates object information which is indicated by the already-generated object information table into information which is generated as result of the re-performed object identification process. In a case where, as a result of re-performing the object identification process for the emission region for which the object information table has been already generated, the control calculation section 103 identifies an object which is not indicated by the already-generated object information table, the control calculation section 103 adds information of that object to the already-generated object information table.

Hereinafter, a description will be given of a relative speed which is indicated by the object information table generated by the distance detection section 1031 of the control calculation section 103. The control calculation section 103 performs the object identification process and the individual measurement process for the emission region for which the object information table has been already generated, and thereby calculates a relative speed between the object measuring device and the object existing in the emission region. In more detail, for each individual object indicated by the object information table, the control calculation section 103: calculates, as the relative speed, a difference per unit time between the position of the object, which is calculated in the most recent individual measurement process for an emission region, and the position of the object, which has been calculated in the immediately preceding individual measurement process for the same emission region; and stores the relative speed as information indicated by the object information table such that the relative speed is associated with each individual object.

The above is the detailed description of the operations of the object measuring device 1 according to the present embodiment. In the above description of the object identification process, the control calculation section 103 stores the positions of the objects, which are indicated by the object position information Tj generated by the obstacle identification section 1033, as the positions to be indicated in the object information table, and then the control calculation section 103 updates the stored positions of the objects into the positions measured in the individual measurement process, respectively. However, the control calculation section 103 may directly store the positions of the objects measured in the individual measurement process, as information to be indicated in the object information table, without storing the positions indicated by the object position information Tj, as information to be indicated in the object information table.

Figure 14:
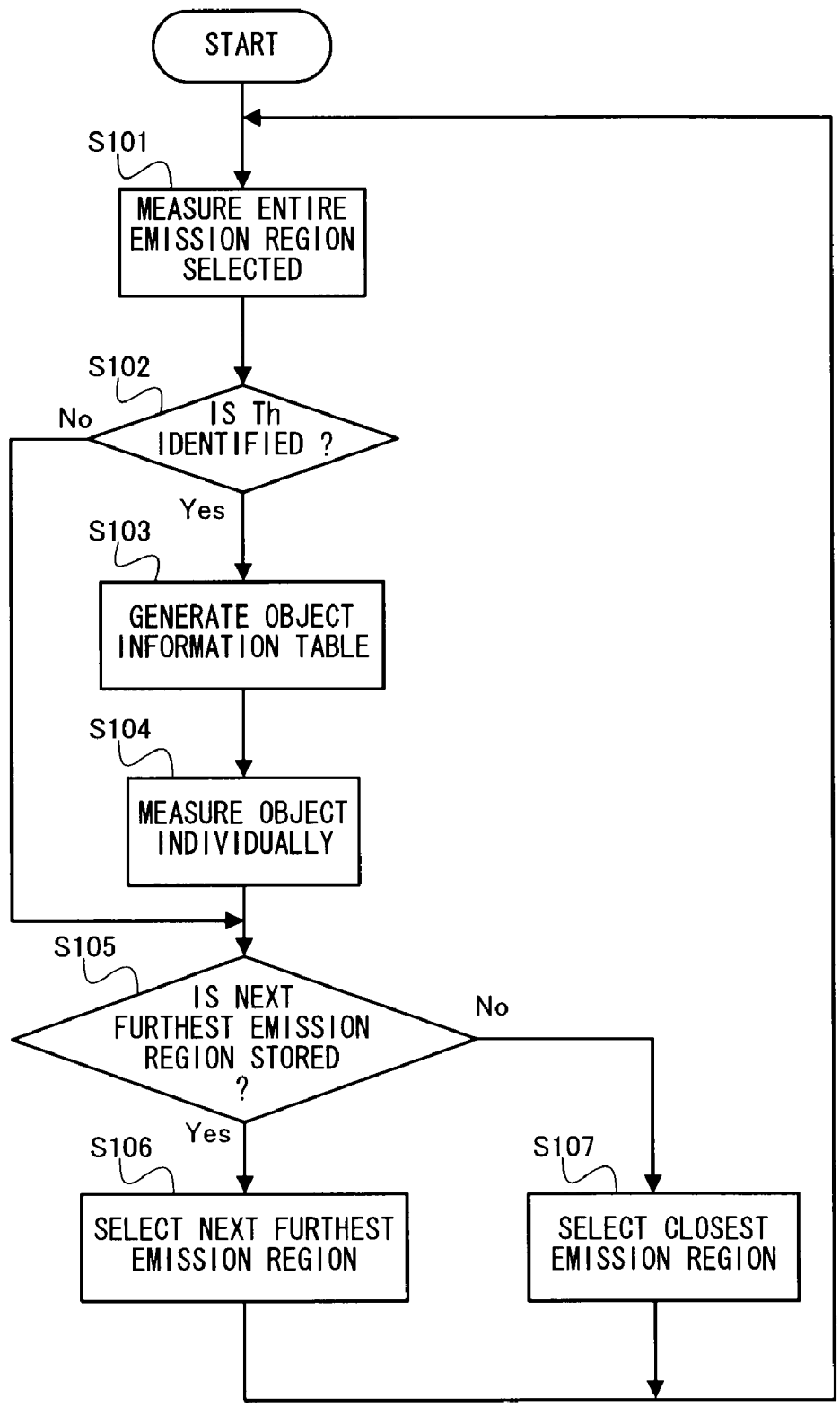
FIG. 14 is a flow chart illustrating a process performed by the control calculation section according to a first embodiment.

Next, with reference to a flow chart shown in FIG. 14, a description will be given of a process performed when the control calculation section 103 of the present embodiment operates the distance detection section 1031, the position calculation section 1032, the obstacle identification section 1033, and the spread angle determination section 1034, in the above-described manner, to measure an object. The process shown in a flow chart of FIG. 14 is started at a predetermined time, such as at the time when an ignition key of an own vehicle having the object measuring device 1 mounted thereon is turned on, at the time when an own vehicle having the object measuring device 1 mounted thereon so as to measure an area behind the own vehicle as shown in FIG. 1 is shifted into a reverse gear position, and the like.

In step S101, the control calculation section 103 performs the object identification process for a selected emission region among a plurality of predetermined emission regions. When the control calculation section 103 performs the processing of step S101 for the first time, that is, when no emission region has been selected, the control calculation section 103 performs the object identification process on the assumption that the emission region having the smallest emission distance has been selected. When the processing of step S101 is completed, the control calculation section 103 advances the processing to step S102.

In step S102, the control calculation section 103 determines whether or not the obstacle identification section 1033 can identify an object reflection point Th during the object identification process for the emission region selected in step S101. When, in step S102, the control calculation section 103 determines that an object reflection point Th can be identified, the control calculation section 103 advances the processing to step S103. On the other hand, when, in step S102, the control calculation section 103 determines that an object reflection point Th cannot be identified, the control calculation section 103 advances the processing to step S105.

In step S103, the control calculation section 103 generates an object information table as a result of continuously performing the object identification process for the emission region by the processing of step S101. When the processing of step S103 is completed, the control calculation section 103 advances the processing to step S104.

In step S104, the control calculation section 103 performs the individual measurement process for an object indicated by the object information table which has been generated in step S103. When the processing of step S104 is completed, the control calculation section 103 advances the processing to step S105.

In step S105, the control calculation section 103 determines whether or not the emission region having the next greatest emission distance is stored in the storage section, not shown. When, in step S105, the control calculation section 103 determines that the emission region having the next greatest emission distance is stored, the control calculation section 103 advances the processing to step S106. On the other hand, when the control calculation section 103 determines that the emission region having the next greatest emission distance is not stored, the control calculation section 103 advances the processing to step S107.

In step S106, the control calculation section 103 selects the emission region having the next greatest emission distance, among emission regions stored in the storage section, not shown. When the processing of step S106 is completed, the control calculation section 103 returns the processing to step S101.

In step S107, the control calculation section 103 selects the emission region having the smallest emission distance, among emission regions stored in the storage section, not shown. When the processing of step S107 is completed, the control calculation section 103 returns the processing to step S101.

The above is the description of the processing performed by the control calculation section 103 according to the present embodiment. The object measuring device 1 according to the present embodiment performs the individual measurement process by emitting, at a smaller spread angle Hk, the laser light Lk to an object existing in the emission region for which the object identification process has been performed. Therefore, information of objects existing in the same emission region can be individually measured with a high accuracy.

The object measuring device 1 according to the present embodiment performs the object identification process by emitting the laser light Lk at one emission region angle Hrk, and performs the individual measurement process. Then, the object measuring device 1 performs the object identification process for the emission region having the next greatest emission distance, by emitting the laser light Lk at a smaller emission region angle Hrk, and performs the individual measurement process for the emission region having the next greatest emission distance. Consequently, in the object measuring device 1 according to the present embodiment, an object that cannot have been identified merely by emitting the laser light Lk at one emission region angle Hrk can be identified by emitting, at a smaller emission region angle Hrk, the laser light Lk having a high light energy density as described above.

In addition, in the above description of the first embodiment, an emission period in the object identification process and an emission period in the individual measurement process are set to the same time period. As a result, an emission period in the object identification process for measuring the entire emission region and an emission period in the individual measurement process for measuring each individual object are the same, which enables an emission period for individually measuring one object to be relatively prolonged within a predetermined measurement period. The fact that the emission period can be prolonged means that the time period (second time period) for the charge storage in the detection section 102 can be prolonged. This can improve the S/N ratio to thereby provide a measurement with an increased accuracy. Here, the predetermined measurement period is a time period required for completing the object identification process and the individual measurement process for one emission region. The emission period in the object identification process and the emission period in the individual measurement process may be set as different emission periods, as long as the accuracy in the individual measurement process can be increased.

Moreover, as described above, by narrowing the spread angle Hk, the S/N ratio can be improved to thereby provide a measurement with an increased accuracy. However, if the entire emission region is scanned with the laser light Lk having a narrow spread angle Hk, a time necessary for scanning the entire emission region increases. In the object measuring device 1 according to the first embodiment, in the object identification process, the entire emission region is measured to identify objects, and then, in the individual measurement process, an object that has to be measured is measured by being irradiated with the laser light Lk having a smaller spread angle Hk. As a result, an accurate measurement can be performed in a short time.

Furthermore, in the object measuring device 1 according to the first embodiment, the object identification process is performed and objects are recognized by identifying, among reflection points of vehicles, pedestrians, and obstacles including the road surface, reflection points other than the road surface. Then, only the recognized objects are measured in the individual measurement process. Consequently, an accurate measurement can be performed, without an unnecessary measurement of an object that does not have to be measured.

Second Embodiment

An object measuring device 1 according to a second embodiment corrects a direction in which a laser light Lk is emitted and a spread angle Hk of the laser light Lk, based on a distance image indicated by the distance image information Kj. In the following, a description will be given of an operation, in correction, of the object measuring device 1 according to the present embodiment. The control calculation section 103 according to the second embodiment is different from the control calculation section 103 according to the first embodiment, in that the control calculation section 103 according to the second embodiment functions also as a correction section 1035. Accordingly, a configuration of the object measuring device 1 according to the second embodiment, and functions, except the function as the correction section 1035, of the control calculation section 103 according to the second embodiment, are the same as those of the control calculation section 103 according to the first embodiment, and therefore a description thereof will be omitted.

Figure 15:
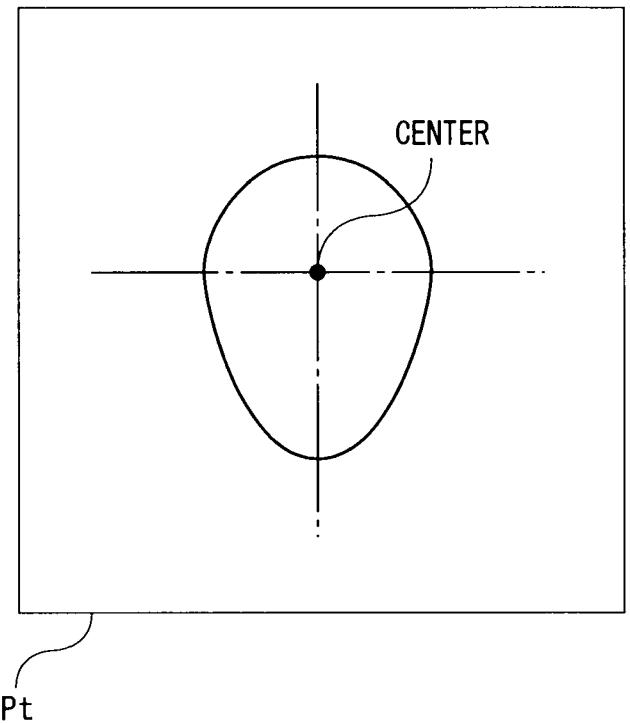
FIG. 15 is a diagram showing an example of a pattern image.

FIG. 15 is a diagram showing an example of a pattern image Pt which is used for correcting an emission direction and a spread angle Hk of the laser light Lk emitted by the object measuring device 1 according to the second embodiment. The control calculation section 103 stores, in a storage section which is not shown, a pattern image Pt corresponding to a reference emission region Khr for a correction. The pattern image Pt is an image previously formed so as to indicate an irradiation region, on a distance image, of a laser light Lk which is emitted from the emission section 101 to the reference emission region Khr, which is defined by a predetermined reference direction Kh and a predetermined reference spread angle Khk, when the own vehicle is substantially parallel to a flat road surface (for example, when the bottom surface of the own vehicle is substantially parallel to the flat road surface). The pattern image Pt shown as an example in FIG. 15 is an image previously formed so as to indicate an irradiation region obtained when a laser light Lk is emitted to the flat road surface from the object measuring device 1, which is mounted in the manner described above in the first embodiment with reference to FIG. 1. Therefore, the pattern image Pt shown in FIG. 15 has a distorted circle shape.

When a correction process is started, firstly, the control calculation section 103 causes the distance detection section 1031 to provide the detection section 102 with an instruction to start a charge storage for the first time period. When the first time period elapses after the instruction to start a charge storage for the first time period has been provided, the control calculation section 103 causes the distance detection section 1031 to instruct the emission section 101 to emit the laser light Lk at the reference spread angle Khk in the reference direction Kh. When the third time period elapses after the control calculation section 103 has provided the instruction to start a charge storage for the first time period, the control calculation section 103 detects a charge stored in each light-receiving element of the detection section 102 as described in the first embodiment, and causes the distance detection section 1031 to generate distance image information Kj indicating the aforementioned distance image.

When the distance image information Kj is generated, the correction section 1035 of the control calculation section 103 acquires the generated distance image information Kj. When the correction section 1035 acquires the distance image information Kj, the correction section 1035 of the control calculation section 103 identifies an irradiation region of the laser light Lk, on the distance image indicated by the acquired distance image information Kj. Any known method may be adopted as a method for identifying, by the correction section 1035 of the control calculation section 103, an irradiation region of the laser light Lk on the distance image. As an example, a pattern matching method using a predetermined image may be adopted. In such a case, an image to be used may be the pattern image Pt.

When the correction section 1035 acquires the distance image information Kj, the control calculation section 103 compares the irradiation region of the laser light Lk on the distance image indicated by the acquired distance image information Kj, with the irradiation region on the pattern image Pt prestored in the storage section which is not shown.

Figure 16A:
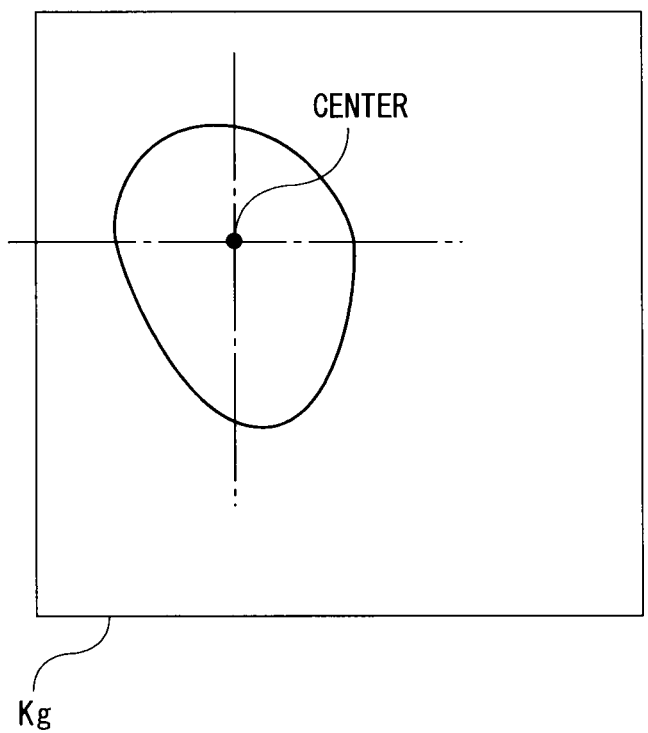
FIG. 16A is a diagram showing an example of an irradiation region on a distance image.
Figure 16B:
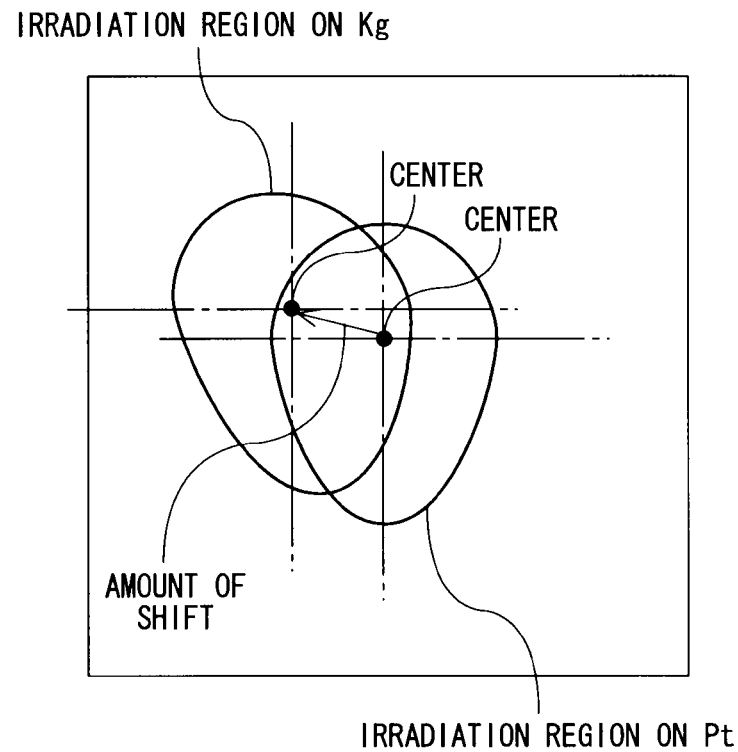
FIG. 16B is a diagram showing an example of an irradiation region on a distance image and an irradiation region on a pattern image.

To be more specific, the correction section 1035 of the control calculation section 103 calculates the center of an irradiation region on a distance image Kg which is indicated by the distance image information Kj, as shown in FIG. 16A. When the center of the irradiation region on the distance image Kg is calculated, the control calculation section 103 superimposes the distance image Kg and the pattern image Pt on each other, and the correction section 1035 detects the amount of deviation of the center of the irradiation region on the distance image Kg from the center of the irradiation region on the pattern image Pt, as shown in FIG. 16B. When the correction section 1035 detects the amount of deviation of the center of the irradiation region, the control calculation section 103 causes the correction section 1035 to provide the emission section 101 with an instruction to set, as the reference direction Kh, an angle resulting from changing the angle of the optical axis of the laser light Lk in accordance with the detected amount of deviation.

Figure 16C:
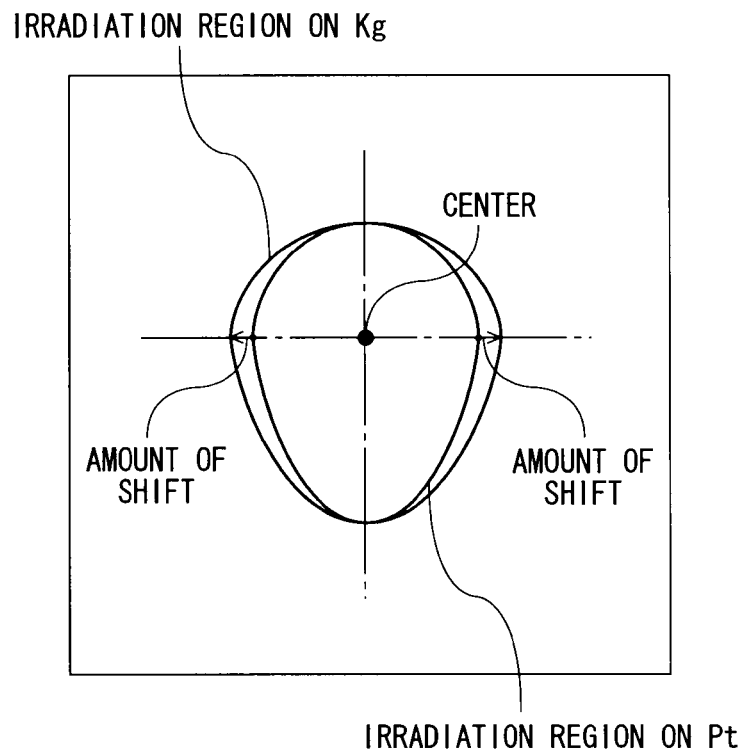
FIG. 16C is a diagram showing an example of an irradiation region on a distance image and an irradiation region on a pattern image.

When the reference direction Kh is corrected, the correction section 1035 of the control calculation section 103 corrects the reference spread angle Khk. FIG. 16C is a diagram showing the irradiation region on the distance image and the irradiation region on the pattern image Pt with the centers of the respective irradiation regions being coincident with each other. When the reference spread angle Khk is deviated, a deviation occurs between the irradiation region of the laser light Lk emitted from the emission section 101 and the irradiation region on the pattern image Pt, even though the centers of the respective irradiation regions coincide with each other, as shown in FIG. 16C. The correction section 1035 of the control calculation section 103 detects a deviation which occurs when the center of the irradiation region of the laser light Lk and the center of the irradiation region on the pattern image Pt coincide with each other. When the correction section 1035 detects the amount of deviation of the irradiation region of the laser light Lk, the control calculation section 103 causes the correction section 1035 to provide the emission section 101 with an instruction to set, as the reference spread angle Khk, a spread angle Hk resulting from changing the spread angle Hk of the laser light Lk in accordance with the detected amount of deviation.

When provided with the instructions indicating the reference direction Kh and the reference spread angle Khk, the emission section 101 sets the reference direction Kh and the reference spread angle Khk which are indicated by the instructions, as a reference of the direction of the optical axis of the laser light Lk and a reference of the spread angle Khk, respectively. Thus, the emission section 101 emits the laser light Lk in accordance with an instruction provided thereafter.

The above is the description of the correction process performed by the control calculation section 103 according to the second embodiment. Next, conditions under which the control calculation section 103 according to the second embodiment starts the correction process will be described. The control calculation section 103 starts the correction process, when at least one of the three conditions described below is satisfied.

The first condition is that, based on a change in brightness in the distance image, it can be determined that the own vehicle is substantially parallel to the road surface. More specifically, each time the distance detection section 1031 generates distance image information Kj, the control calculation section 103 causes the correction section 1035 to acquire the distance image information Kj and to determine whether or not the amount of change, over a predetermined time period, in the brightness values of a plurality of predetermined pixels in the distance image, which is generated as described in the first embodiment, is equal to or lower than a predetermined threshold. When the correction section 1035 determines that the amount of change, over the predetermined time period, in the brightness values of the plurality of predetermined pixels in the distance image is equal to or lower than the predetermined threshold, the control calculation section 103 can determine that the own vehicle is substantially parallel to the road surface. As described above, the pattern image Pt is an image previously formed so as to indicate an irradiation region, on a distance image, of a laser light Lk which is emitted from the emission section 101 to the reference emission region Khr, which is defined by the predetermined reference direction Kh and the predetermined reference spread angle Khk, when the own vehicle is substantially parallel to a flat road surface. Accordingly, the control calculation section 103 can perform a correction with an increased accuracy, by causing the correction section 1035 to compare the distance image, which is indicated by the distance image information Kj generated when the own vehicle is substantially parallel to the road surface, with the pattern image Pt.

The second condition is that, the control calculation section 103 causes the correction section 1035 to obtain the variance G among the brightness of respective pixels included in each divided region, which is obtained as a result of dividing the distance image into a plurality of divided regions, and the control calculation section 103 can determine that the obtained variance a is equal to or lower than a predetermined threshold. For example, when the distance image includes a pixel that has a brightness value corresponding to a puddle, brightness values over the entire distance image becomes largely uneven, which increases the possibility that the correction section 1035 cannot identify an accurate irradiation region of the laser light Lk on the distance image. Therefore, the control calculation section 103 can surely perform an accurate correction, by starting the correction process when the correction section 1035 determines that the variance σ among the brightnesses of the respective pixels included in each divided region is equal to or lower than the predetermined threshold.

The third condition is that the correction section 1035 of the control calculation section 103 can determine that a change in orientation of the own vehicle is small, by using an acceleration sensor, a yaw rate sensor, a vehicle speed sensor, and the like, which are provided in the own vehicle. More specifically, the control calculation section 103 causes the correction section 1035 to determine whether or not an acceleration, a yaw angle, and a speed, of the own vehicle, which the correction section 1035 have detected by using the acceleration sensor, the yaw rate sensor, and the vehicle speed sensor, respectively, provided in the own vehicle, are equal to or lower than predetermined thresholds, respectively. When the acceleration, a yaw angle, and a speed, of the own vehicle are equal to or lower than the predetermined thresholds, respectively, it can be considered that a change in orientation of the own vehicle is small, and therefore the own vehicle is substantially parallel to the road surface. Thus, because of the same reason as described in relation to the first condition above, the correction section 1035 of the control calculation section 103 can perform a correction with an increased accuracy.

The above is the description of the object measuring device 1 according to the second embodiment. In the object measuring device 1 according to the second embodiment, a correction can be automatically performed when at least one of the above-described conditions is satisfied during operation, and thus the laser light Lk can be always emitted from the emission section 101 at an accurate spread angle in an accurate direction.

In all the above embodiments, a case in which the object measuring device 1 is mounted in the vehicle has been described as an example. However, the object measuring device according to the present invention may be mounted in any object, as long as the object exists on the road surface or a face equivalent to the reference plane Km mentioned above.

Moreover, in all the embodiments described above, a laser light is adopted as a light source of the emission section 101. However, in another embodiment, an LED (Light Emitting Diode) may be adopted as the light source.

Figure 17:
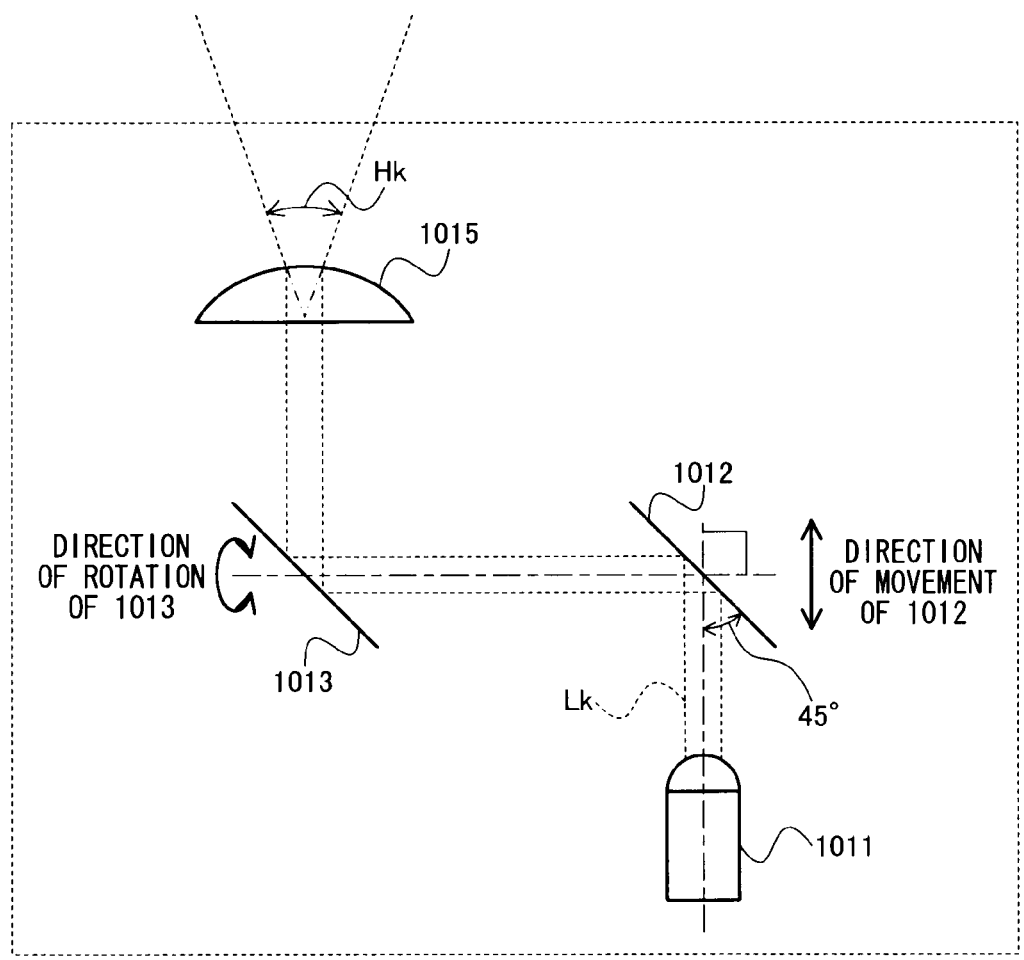
FIG. 17 is a diagram showing an example of another configuration of the emission section.

In still another embodiment, the diffusion plate 1014 may be removed from the emission section 101 and the emission section 101 may be configured to emit a laser light Lk to a region according to an instruction, as shown in FIG. 17.

In further still another embodiment, the emission section 101 in which the second reflecting plate 1012 is fixed may be configured to emit a laser light Lk to a region according to an instruction, as shown in FIG. 18.

In further still another embodiment, as an electromagnetic wave, a radio wave may be emitted instead of the laser light Lk. In such a case, the emission section described in the first embodiment may be configured of a radio wave emission section which emits a radio wave, first and second reflecting plates which respectively reflect the radio wave in the manner described in the first embodiment, a diffusion plate which diffuses the radio wave in the manner described in the first embodiment, and a lens which emits the radio wave in the manner described in the first embodiment, instead of the light source 1011, the first and second reflecting plates 1012 and 1013, the diffusion plate 1014, and the lens 1015, respectively. In addition, instead of the light-receiving elements arranged in a grid pattern on the flat substrate, a receiving element, which is capable of receiving a reflected wave of the radio wave emitted from the emission section, may receive the reflected wave to perform the process described in the first embodiment.

The control calculation section 103 may be realized by, instead of the CPU, an LSI, a microcomputer, or the like, interpreting and executing predetermined program data which enables execution of the above-described process and is stored in a storage device (a ROM, a RAM, a hard disk, or the like). Moreover, the above-described CPU may be a CPU that forms an ECU (Electric Control Unit) mounted in a mobile body such as an automobile. In such a case, the program data may be introduced into the storage device via a storage medium, or may be executed directly on the storage medium. Here, the storage medium may be: a semiconductor memory such as a ROM, a RAM, and a flash memory; a magnetic disk memory such as a flexible disk and a hard disk; an optical disk memory such as a CD-ROM, a DVD, and a BD; a memory card; and the like.

Needless to say, any combination of the above-described embodiments is acceptable.

While the invention has been described in detail, the foregoing description is in all aspects illustrative and not restrictive. It is understood that numerous other modifications and variations can be devised without departing from the scope of the present invention.

INDUSTRIAL APPLICABILITY

The present invention enables an object existing in a measurement range to be measured with an increased accuracy, and is applicable to an object measuring device mounted in a mobile body such as a vehicle, for example.

The invention claimed is:
1. An object measuring device mounted in a vehicle, comprising:
    a first emission section that emits, at a predetermined first spread angle, an electromagnetic wave to a predetermined region;
    a reception section that receives, by receiving elements arranged in a grid pattern, a reflected wave of the electromagnetic wave;
    a distance detection section that detects, for each of the receiving elements, a relative distance between each receiving element and a reflection point of the reflected wave, based on a reception time period from emission of the electromagnetic wave to reception of the reflected wave;
    a calculation section that calculates position information which indicates a position of the reflection point by using as a reference a position of mounting in the vehicle, based on at least the relative distance and an angle at which the reception section is mounted in the vehicle;
    a reference plane calculation section that calculates, as a reference plane, a plane parallel to a bottom surface of the vehicle, based on an orientation of the vehicle;
    an identification section that identifies, based on the position information, adjacent reflection points, wherein a difference in height from the reference plane between the adjacent reflection points is equal to or larger than a predetermined first threshold; and
    a second emission section that emits, at a second spread angle which is smaller than the first spread angle, the electromagnetic wave to the reflection points, when the identification section identifies the reflection points.

2. The object measuring device according to claim 1, wherein, when the identification section identifies the reflection points, the second emission section emits the electromagnetic wave to the reflection points, in order starting from the reflection point having the smallest relative distance.

3. The object measuring device according to claim 1, further comprising an object identification section that: groups the reflection points identified by the identification section such that the adjacent reflection points which are spaced from each other over a distance equal to or less than a predetermined second threshold are in one group; and identifies the reflection points in one group, as one object,
    wherein the second emission section emits the electromagnetic wave to the reflection points of the object identified by the object identification section.

4. The object measuring device according to claim 3, wherein:
    the second emission section emits the electromagnetic wave to the reflection points, in order from the reflection point of the object closest to the object measuring device, among objects identified by the object identification section; and the distance detection section detects the relative distance for each object, in the order in which the second emission section has emitted the electromagnetic wave to the objects.

5. The object measuring device according to claim 4, wherein the distance detection section detects the relative distance for each object, based on the reception time period for receiving the reflected wave having the highest intensity, among reflected waves reflected from the reflection points which have been grouped as the one object.

6. The object measuring device according to claim 5, wherein, after the distance detection section detects all the relative distances for the respective objects, the first emission section emits, at a third spread angle which is smaller than the first spread angle, the electromagnetic wave to a next predetermined region immediately following the predetermined region.

7. The object measuring device according to any one of claims 4 to 6, further comprising a speed detection section that detects, for each object, a relative speed between the object measuring device and the object, based on the most recent relative distance and the previously detected relative distance which are respectively detected by the distance detection section.

8. An object measuring method which is performed in an object measuring device mounted in a vehicle, the object measuring method comprising:

a first emission step of emitting, at a predetermined first spread angle, an electromagnetic wave to a predetermined region;

a reception step of receiving, by receiving elements arranged in a grid pattern, a reflected wave of the electromagnetic wave;

a distance detection step of detecting, for each of the receiving elements, a relative distance between each receiving element and a reflection point of the reflected wave, based on a reception time period from emission of the electromagnetic wave to reception of the reflected wave;

a calculation step of calculating position information which indicates a position of the reflection point by using as a reference a position of mounting in the vehicle, based on at least the relative distance and an angle at which the receiving element is mounted in the vehicle;

a reference plane calculation step of calculating, as a reference plane, a plane parallel to a bottom surface of the vehicle, based on an orientation of the vehicle;

an identification step of identifying, based on the position information, adjacent reflection points, wherein a difference in height from the reference plane between the adjacent reflection points is equal to or larger than a predetermined first threshold; and a second emission step of emitting, at a second spread angle which is smaller than the first spread angle, the electromagnetic wave to the reflection points, when the reflection points are identified in the identification step.

* * * * *